(12) United States Patent
Lohmeier et al.

(10) Patent No.: US 7,336,219 B1
(45) Date of Patent: Feb. 26, 2008

(54) SYSTEM AND METHOD FOR GENERATING A RADAR DETECTION THRESHOLD

(75) Inventors: Stephen P. Lohmeier, Westford, MA (US); Wilson J. Wimmer, Hudson, NH (US)

(73) Assignee: Valeo Raytheon Systems, Inc., Hudson, NH (US)

( * ) Notice: Subject to any disclaimer, the term of this patent is extended or adjusted under 35 U.S.C. 154(b) by 206 days.

(21) Appl. No.: 11/322,684

(22) Filed: Dec. 30, 2005

(51) Int. Cl.
*G01S 13/04* (2006.01)
*G01S 7/40* (2006.01)
*G01S 13/93* (2006.01)
(52) U.S. Cl. .................. 342/159; 342/70; 342/71; 342/21; 342/174; 342/196
(58) Field of Classification Search ............... 342/159
See application file for complete search history.

(56) References Cited

U.S. PATENT DOCUMENTS

| | | | |
|---|---|---|---|
| 2,540,839 A | 2/1951 | Southworth | |
| 2,868,970 A * | 1/1959 | Aitken | 327/165 |
| 3,487,405 A | 12/1969 | Molho et al. | |
| 3,587,097 A | 6/1971 | Stull, Jr. | |
| 3,668,702 A | 6/1972 | Jones | |
| 3,701,149 A | 10/1972 | Patton et al. | |
| 3,761,922 A | 9/1973 | Evans | |
| 3,775,770 A | 11/1973 | Dillard et al. | |
| 3,778,822 A | 12/1973 | Bauer | |
| 3,778,825 A | 12/1973 | Ares et al. | |
| 3,801,983 A | 4/1974 | Woolley | |
| 3,950,748 A | 4/1976 | Busy | |
| 3,968,490 A | 7/1976 | Gostin | |
| 3,995,270 A | 11/1976 | Perry et al. | |
| 4,067,013 A | 1/1978 | Smith | |
| 4,074,264 A | 2/1978 | Wilmonti | |
| 4,075,703 A | 2/1978 | Dillard | |
| 4,143,371 A * | 3/1979 | Salvaudon et al. | 342/94 |
| 4,213,127 A | 7/1980 | Cole | |
| 4,249,177 A | 2/1981 | Chen | |
| 4,286,236 A | 8/1981 | Fischer | |

(Continued)

FOREIGN PATENT DOCUMENTS

WO    WO 2004/044610 A1    5/2004

OTHER PUBLICATIONS

Cheng; "A Fast Hybrid MoM/FEM Technique for Microstripline Vertical Couplers With Multiple Identical Cavaties;" IEEE Jun. 2003; 0-7803-7846; pp. 1076-1079.

(Continued)

*Primary Examiner*—Thomas H. Tarcza
*Assistant Examiner*—Shelley Chen
(74) *Attorney, Agent, or Firm*—Daly, Crowley, Mofford & Durkee, LLP

(57) ABSTRACT

A method for generating a radar detection threshold includes computing a first plurality of percentile values associated with frequency domain values of frequency domain signals. The first plurality of percentile values is used to generate detection threshold values. Apparatus for generating a radar detection threshold includes a first percentile processor adapted to compute a first plurality of percentile values associated with frequency domain values of frequency domain signals. A threshold processor is adapted to use the plurality of percentile values to generate detection threshold values.

28 Claims, 11 Drawing Sheets

U.S. PATENT DOCUMENTS

| | | | | |
|---|---|---|---|---|
| 4,758,839 | A * | 7/1988 | Goebel et al. | 342/122 |
| 4,972,430 | A * | 11/1990 | Cantwell | 375/130 |
| 5,107,351 | A * | 4/1992 | Leib et al. | 359/11 |
| 5,170,359 | A * | 12/1992 | Sax et al. | 702/73 |
| 5,181,226 | A * | 1/1993 | Cantwell | 375/130 |
| 5,194,823 | A | 3/1993 | Wendt et al. | |
| 5,237,331 | A * | 8/1993 | Henderson et al. | 342/54 |
| 5,485,157 | A | 1/1996 | Long | |
| 5,499,030 | A | 3/1996 | Wicks et al. | |
| 5,526,357 | A * | 6/1996 | Jandrell | 370/346 |
| 5,592,178 | A | 1/1997 | Chang et al. | |
| 5,703,592 | A | 12/1997 | Watts | |
| 5,708,433 | A | 1/1998 | Craven | |
| 5,727,023 | A | 3/1998 | Dent | |
| 5,781,144 | A * | 7/1998 | Hwa | 342/13 |
| 5,949,368 | A * | 9/1999 | DeCesare | 342/93 |
| 6,039,580 | A | 3/2000 | Sciarretta et al. | |
| 6,167,286 | A | 12/2000 | Ward et al. | |
| 6,198,449 | B1 | 3/2001 | Muhlhauser et al. | |
| 6,218,987 | B1 | 4/2001 | Derneryd et al. | |
| 6,324,755 | B1 | 12/2001 | Borkowski et al. | |
| 6,463,303 | B1 | 10/2002 | Zaho | |
| 6,489,927 | B2 | 12/2002 | LeBlanc et al. | |
| 6,492,949 | B1 | 12/2002 | Berglia et al. | |
| 6,501,415 | B1 | 12/2002 | Viana et al. | |
| 6,577,269 | B2 | 6/2003 | Woodington et al. | |
| 6,577,879 | B1 | 6/2003 | Hagerman et al. | |
| 6,642,908 | B2 | 11/2003 | Pleva et al. | |
| 6,683,557 | B2 | 1/2004 | Pleva et al. | |
| 6,683,568 | B1 * | 1/2004 | James et al. | 342/387 |
| 6,717,545 | B2 * | 4/2004 | Dizaji et al. | 342/93 |
| 6,738,017 | B2 | 5/2004 | Jacomb-Hood | |
| 6,771,209 | B1 | 8/2004 | Long | |
| 6,784,838 | B2 | 8/2004 | Howell | |
| 6,847,324 | B1 * | 1/2005 | Honey et al. | 342/91 |
| 6,864,699 | B2 | 3/2005 | Sakayori et al. | |
| 6,933,900 | B2 | 8/2005 | Kitamori et al. | |
| 6,972,712 | B1 * | 12/2005 | Karlsson | 342/124 |
| 6,995,730 | B2 | 2/2006 | Pleva et al. | |
| 7,038,608 | B1 | 5/2006 | Gilbert | |
| 7,123,145 | B2 * | 10/2006 | Reilly et al. | 370/552 |
| 7,248,215 | B2 * | 7/2007 | Pleva et al. | 342/368 |
| 2003/0174088 | A1 * | 9/2003 | Dizaji et al. | 342/93 |
| 2004/0027305 | A1 | 2/2004 | Pleva et al. | |
| 2004/0164892 | A1 | 8/2004 | Shinoda et al. | |
| 2004/0208249 | A1 | 10/2004 | Risbo et al. | |
| 2006/0125682 | A1 | 6/2006 | Kelly, Jr. et al. | |

OTHER PUBLICATIONS

Gao et al.: "Adaptive Linerization Schemes for Weakly Nonlinear Systems Using Adaptive Linear and Nonlinear FIR Filters;" Dept. of Electrical Engineering, University of Toronto; IEEE; Jan. 1991; CH2819-1/90/0000-0009; pp. 9-12.

Lin et al.; "A High Speed Low-Noise Equalization Technique with Improved Bit Error Rate;" EEE; Jul. 2002; 0-7803-7448; pp. 564-567.

Lohinetong et al.; "Microstrip To Surface Mounted Foam-Based Waveguide Transition For Ka-Band Filter Integration;" IEEE Jun. 2004; 0-7803-8401; pp. 899-902.

Mueller; "SMD-Type 42 GHz Waveguide Filter;" IEEE Jan. 2003; 0-7803-7695; pp. 1089-1092.

Nordsjo; "An Algorithm for Adaptive Predisortion of Certain Time-Varying Nonlinear High-Power Amplifiers;" 2002 The Institution of Electrical Engineers; XP-002364938; pp. 469-473.

EP Search Report and Written Opinon of the European Patent Office for EP 05 11 1991.5; dated Mar. 2, 2006.

EP Search Report and Written Opinion of the European Patent Office for EP 05 11 1994.9 dated Mar. 31, 2006.

EP Report and Written Opinion of the European Patent Office for EP 05 111 983.2 dated Apr. 7, 2006.

Pleva, et al.; "Beam Architecture For Improving Angular Resolution"; U.S. Appl. No. 11/026,506, filed Dec. 30, 2004.

Gilbert, "Digital to Analog Converter;" U.S. Appl. No. 11/013,950, filed Dec. 16, 2004.

Leblanc et al.; "Vehicle Radar Sensor Assembly"; U.S. Appl. No. 11/323,816, filed Dec. 30, 2005.

Pleva, et al.; "Waveguide—Printed Wiring Board (PWB) Interconnection"; U.S. Appl. No. 11/027,523, filed Dec. 30, 2004.

Kelly, Jr. et al.; "Method and System for Radar Processing;" U.S. Appl. No. 11/458,126, filed Jul. 18, 2006.

Woodington, et al.; "Detecting Signal Interference In A Vehicle System"; U.S. Appl. No. 11/427,829, filed Jun. 30, 2006.

Gilbert; "Multi-Stage Finite Impulse Response Filter Processing"; U.S. Appl. No. 11/323,459, filed Dec. 30, 2005.

Woodington, et al.; "Multichannel Processing Of Signals In A Radar System"; U.S. Appl. No. 11/323,458, filed Dec. 30, 2005.

Woodington, et al.; "Vehicle Radar Systems Having Multiple Operating Modes"; U.S. Appl. No. 11/324,035, filed Dec. 30, 2005.

Hunt; "Generating Event Signals In A Radar System;" U.S. Appl. No. 11/323,960, filed Dec. 30, 2005.

Lohmeier et al.; "System and Method For Verifying A Radar Detection;" U.S. Appl. No. 11/324,073, filed Dec. 30, 2005.

Lohmeier et al.; "Method And System For Generating A Target Alert;" U.S. Appl. No. 11/322,869, filed Dec. 30, 2005.

* cited by examiner

SYSTEM AND METHOD FOR GENERATING A RADAR DETECTION THRESHOLD

CROSS REFERENCE TO RELATED APPLICATIONS

Not Applicable.

STATEMENT REGARDING FEDERALLY SPONSORED RESEARCH

Not Applicable.

FIELD OF THE INVENTION

This invention relates generally to vehicle radar systems and more particularly to vehicle radar systems adapted to detect other vehicles and objects in proximity to the vehicle.

BACKGROUND OF THE INVENTION

As is known by those in the art, radar systems have been developed for various applications associated with vehicles, such as automobiles and boats. A radar system mounted on a vehicle detects the presence of objects including other vehicles in proximity to the vehicle. In an automotive application, such a radar system can be used in conjunction with the braking system to provide active collision avoidance or in conjunction with the automobile cruise control system to provide intelligent speed and traffic spacing control. In a further application, the vehicle radar system provides a passive indication of obstacles to a driver of the vehicle on a display, and in particular, detects objects in a blind spot of the vehicle.

Rear and side view mirrors of various sizes and features are typically used in an effort to improve visualization of blind spots. For example, convex mirrors provide a larger view than flat mirrors. However, objects viewed in a convex mirror appear farther away than their actual distance from the vehicle. Also, the view through mirrors degrades during conditions of rain, snow, or darkness.

SUMMARY OF THE INVENTION

The present invention provides a system and method for generating a radar detection threshold. While examples of the method and system shown below include a radar system as used on an automobile, and, in particular, a radar system used for side object detection, the method and system apply to any radar system that uses a detection threshold, including, but not limited to, a forward-looking and a rear-looking automobile radar system.

In accordance with the present invention, a method of generating a radar threshold associated with a radar includes transmitting a plurality of radio frequency (RF) signals and receiving a plurality of composite signals including at least one of received RF signals and noise signals. The method further includes converting the plurality of composite signals to provide a plurality of baseband signals and transforming the plurality of baseband signals to the frequency domain to provide a respective plurality of frequency domain signals. Each one of the plurality of frequency domain signals has a corresponding plurality of frequency domain values and a respective plurality of frequency bins. The method further includes computing a first plurality of percentile values from the plurality of frequency domain values associated with at least two of the plurality of frequency domain signals, and generating a detection threshold associated with the first plurality of percentile values.

In some embodiments, the radar has a field of view, and the method further includes moving the radar system about so that a variety of object pass through the field of view.

In accordance with another aspect of the present invention, apparatus for generating a radar threshold includes a radar transmitter adapted to transmit a plurality of RF signals and a radar receiver adapted to receive a plurality of composite signals including at least one of received RF signals and noise signals. The apparatus further includes a baseband converter adapted to convert the plurality of composite signals to provide an associated plurality of baseband signals and a frequency domain processor adapted to transform the plurality of baseband signals to the frequency domain to provide a respective plurality of frequency domain signals. Each one of the plurality of frequency domain signals has a corresponding plurality of frequency domain values and a respective plurality of frequency bins. The apparatus further includes a first percentile processor adapted to compute a first plurality of percentile values from the plurality of frequency domain values associated with at least two of the plurality of frequency domain signals and a threshold processor adapted to generate a detection threshold associated with the first plurality of percentile values.

With these particular arrangements, an effective way is provided to detect obstacles in a vehicle's blind spots, and generally in proximity to the vehicle, which is accurate and reliable during all types of environmental conditions including rain, snow, and darkness. The detection system is a well-defined detection zone within which there is a very high probability of detection, and outside of which there is a very low probability of detection.

BRIEF DESCRIPTION OF THE DRAWINGS

The foregoing features of the invention, as well as the invention itself may be more fully understood from the following detailed description of the drawings, in which.

DETAILED DESCRIPTION OF THE INVENTION

Before describing the present invention, some introductory concepts and terminology are explained. As used herein, the term "received RF signal" is used to describe a radio frequency (RF) signal received by a receiving radar antenna. As used herein, the term "transmitted RF signal" is used to describe an RF signal transmitted through a transmitting radar antenna. The transmit and receive antennas may be the same physical antenna (i.e. one antenna is used for both transmit and receive) or may be separate antennae. As used herein, the term "echo RF signal" is used to describe an RF signal resulting from a transmitted RF signal impinging upon an object and reflecting and/or scattering from the object. As used herein, the term "interfering RF signal" is used to describe a transmitted RF signal or an echo RF signal associated with another radar system.

In view of the above definitions, it should be appreciated that a received RF signal may or may not include an echo RF signal. The received RF signal may also include or not include an interfering RF signal.

As used herein, the term "composite signal" is used to describe a signal with contributions from at least one of a received RF signal and a noise signal, for example, an electrical noise signal.

As used herein, the term "chirp" is used to describe a signal having a frequency that varies with time during a time window, and which has a start frequency and an end frequency associated with each chirp. A chirp can be a linear chirp, for which the frequency varies in a substantially linear fashion between the start and end frequencies. A chirp can also be a non-linear chirp, in which the frequency varies in a substantially non-linear fashion between the start and end frequencies. A chirp signal can be transmitted through a variety of media, for example, through the air as a transmitted RF chirp signal, or through a wire.

As used herein, the term "controller area network" or "CAN" is used to describe a control bus and associated control processor commonly disposed in automobiles. The CAN bus is typically coupled to a variety of vehicle systems (e.g. air bag, brakes, etc.) A CAN processor is coupled to vehicle systems through the CAN bus which allows the CAN processor to control a variety of automobile functions, for example, anti-lock brake functions. The CAN network may be a wired or a wireless network.

While fast Fourier transforms (FFTs) are described below, which perform a conversion of time domain signals to the frequency domain, it will be appreciated that a variety of other transforms can be used, including, but not limited to discrete Fourier transforms (DFTs).

Figure 1:
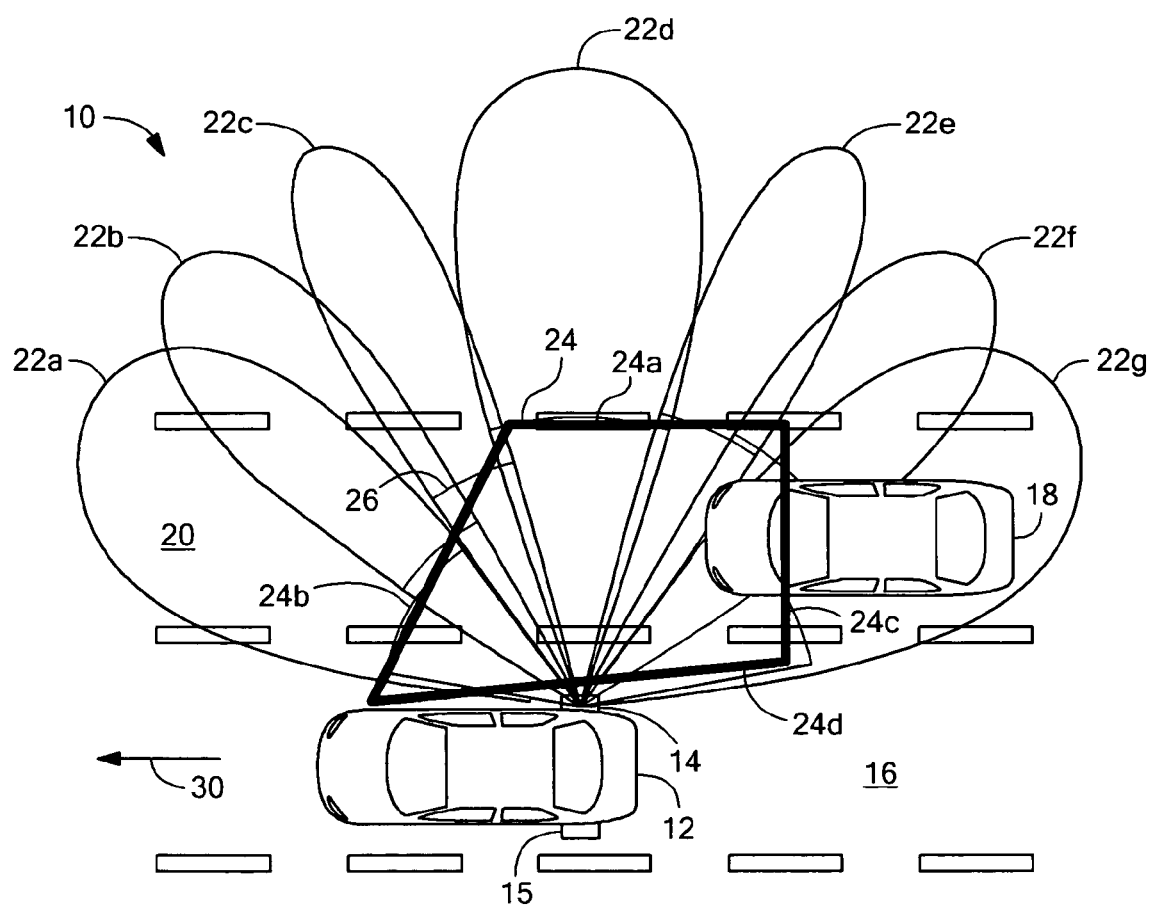
FIG. 1 is a pictorial of a vehicle on which a side object detection (SOD) radar is mounted, which is traveling on a roadway.

Referring to FIG. 1, a first vehicle 12 traveling in a first traffic lane 16 of a road includes a side object detection (SOD) radar 14. The SOD radar 14 is disposed on a side portion of the vehicle 12 and in particular, the SOD radar 14 is disposed on a right rear quarter of the vehicle 14. The vehicle 12 also includes a second SOD radar 15 disposed on a side portion of a left rear quarter of the vehicle 12. The SOD radars 14, 15 may be coupled to the vehicle 12 in a variety of ways. In some embodiments, the SOD radars may be coupled to the vehicle 12 as described in U.S. Pat. No. 6,489,927, issued Dec. 3, 2002, which is incorporated herein by reference in its entirety. A second vehicle 18 travels in a second traffic lane 20 adjacent to the first traffic lane 16. The first and second vehicles 12, 18 are both traveling in a direction according to an arrow 30 and in the respective first and second traffic lanes 16, 20.

The second vehicle 18 may be traveling slower than, faster than, or at the same speed as the first vehicle 12. With the relative position of the vehicles 12, 18 shown in FIG. 1, the second vehicle 18 is positioned in a "blind spot" of the first vehicle 12. The blind spot is an area located on a side of the first vehicle 12 whereby an operator of the first vehicle 12 is unable to see the second vehicle 18 either through side-view mirrors 80, 84 (see FIG. 2) or a rear-view mirror (not shown) of the first vehicle 12.

The SOD radar 14 generates multiple receive beams (e.g., a receive beam 22a, a receive beam 22b, a receive beam 22c, a receive beam 22d, a receive beam 22e, a receive beam 22f and a receive beam 22g) and an associated detection zone 24 having edges 24a-24d. The edges 24a-24c of the detection zone 24 are formed by the SOD radar 14 by way of maximum detection ranges associated with each one of the receive beams 22a-22g, for example, the maximum detection range 26 associated with the receive beam 22c. Each of the receive beams 22a-22g may also have a minimum detection range (not shown), forming the edge 24d of the detection zone 24 closest to the first vehicle.

In one particular embodiment, the SOD radar 14 is a frequency modulated continuous wave (FMCW) radar, which transmits continuous wave chirp RF signals, and which processes received radar signals accordingly. In some embodiments, the SOD radar 14 may be of a type described, for example, in U.S. Pat. No. 6,577,269, issued Jun. 10, 2003; U.S. Pat. No. 6,683,557, issued Jan. 27, 2004; U.S. Pat. No. 6,642,908, issued Nov. 4, 2003; U.S. Pat. No. 6,501,415, issued Dec. 31, 2002; and U.S. Pat. No. 6,492,949, issued Dec. 10, 2002, which are all incorporated herein by reference in their entirety.

In operation, the SOD radar 14 transmits an RF signal having portions, which impinge upon and are reflected from the second vehicle 18 and/or clutter objects, for example, a guardrail or vegetation (not shown). The reflected signals (also referred to as "echo" RF signals) are received in one or more of the receive beams 22a-22g. Other ones of the radar beams 22a-22g, which do not receive the echo RF signal from the second vehicle 18, receive and/or generate other radar signals, for example, noise signals.

In some embodiments, the SOD radar 14 can transmit RF energy in a single broad transmit beam (not shown). In other embodiments, the SOD radar 14 may transmit RF energy in multiple transmit beams (not shown), for example, in seven transmit beams associated with the receive beams 22a-22g.

In operation, the SOD radar 14 can process the received radar signals associated with each one of the receive beams 22a-22g in sequence, in parallel, or in any other time sequence. The SOD radar 14 may be adapted to identify an echo radar signal associated with the second vehicle 18 when any portion of the second vehicle 18 is within the detection zone 24. Therefore, the SOD radar 14 is adapted to detect the second vehicle 18 when at least a portion of the second vehicle is in or near the blind spot of the first vehicle 12.

To this end, signal processing provided by the SOD radar 14, in some embodiments, can be of a type described, for example, in U.S. Pat. No. 6,577,269, issued Jun. 10, 2003, U.S. Pat. No. 6,683,557, issued Jan. 27, 2004, U.S. patent application Ser. No. 11/323,960, filed Dec. 30, 2005, entitled "Generating Event Signals in a Radar System," having inventors Dennis Hunt and Walter Gordon Woodington, U.S. patent application Ser. No. 11/324,073, filed Dec. 30, 2005, entitled "System and Method for Verifying a Radar Detection, having inventors Steven P. Lohmeier and Yong Liu, and U.S. patent application Ser. No. 11/322,869, filed Dec. 30, 2005, entitled "Method and System for Generating a Target Alert," having inventors Steven P. Lohmeier, Wilson J. Wimmer, and Walter Gordon Woodington. Each of these patents and patent applications is incorporated herein by reference in its entirety. Further processing of the composite signal by the SOD radar 14 is described more fully below.

Figure 2:
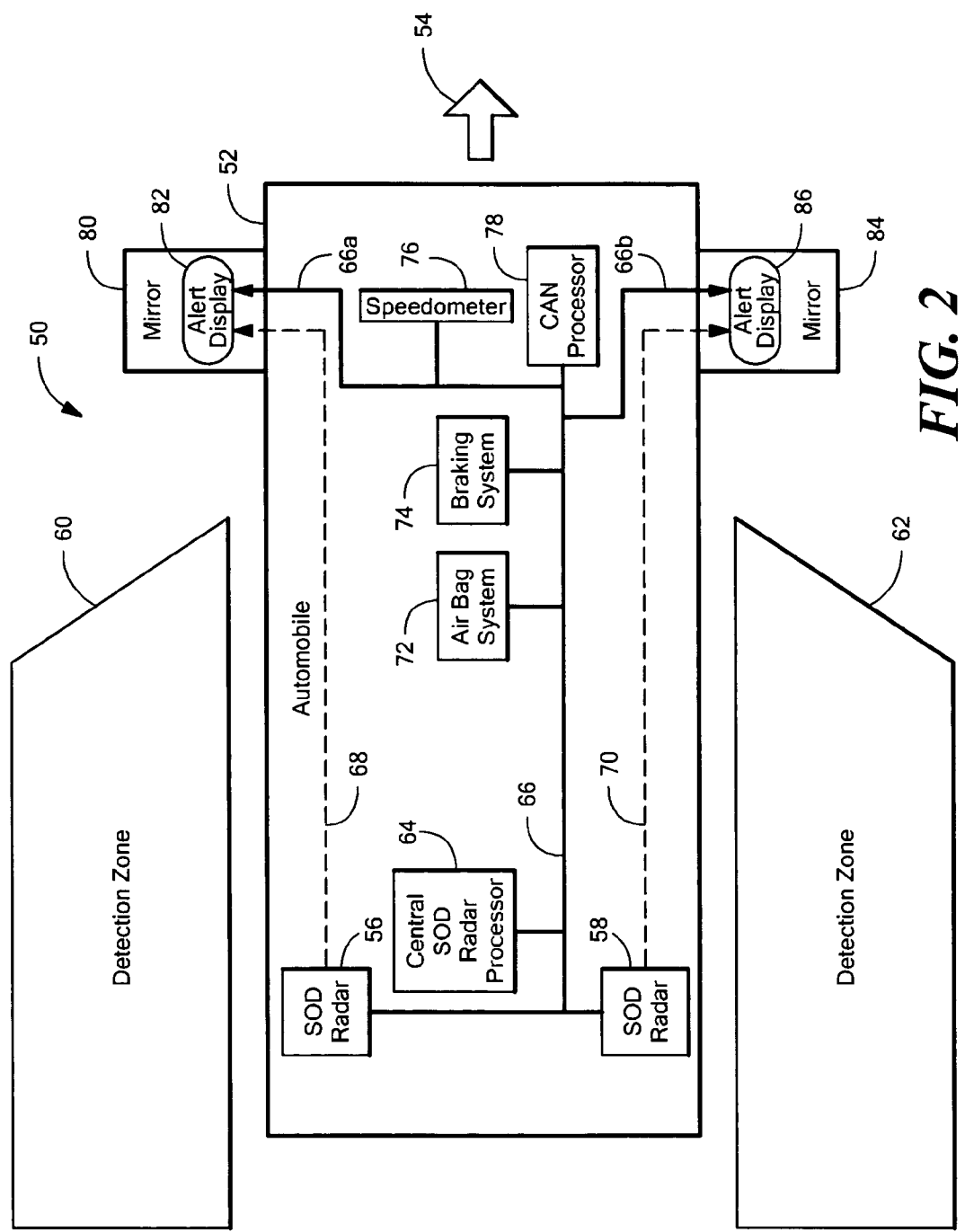
FIG. 2 is a block diagram showing a vehicle on which two SOD radars are mounted.

Referring now to FIG. 2, an exemplary vehicle radar system 50 is associated with an automobile 52 generally traveling in a direction indicated by reference numeral 54. It should be appreciated, however, that the system 50 does not include the vehicle 52. The system 50 includes one or more SOD radars 56, 58. Each one of the SOD radars 56, 58 can be the same as or similar to the SOD radar 14 of FIG. 1.

As described above, the SOD radars 56, 58 can be coupled to the vehicle 52 in a variety of ways. In some embodiments, the SOD radars can be coupled to the vehicle 52 as described in U.S. Pat. No. 6,489,927, issued Dec. 3, 2002, which is incorporated herein by reference it its entirety.

Each one of the SOD radars 56, 58 can be coupled to a central SOD processor 64 via a Controller Area Network (CAN) bus 66. Other automobile systems can also be coupled to the CAN bus 66, for example, an air bag system 72, a braking system 74, a speedometer 76, and a CAN processor 78.

The 50 includes two side view mirrors 80, 84, each having an alert display 82, 86, respectively, viewable therein. Each one of the alert displays 82, 86 is adapted to provide a visual alert to an operator of the vehicle 52, indicative of the presence of another automobile in a blind spot of the vehicle 52. To this end, in operation, the SOD radar 56 forms a detection zone 60 and the SOD radar 58 forms a detection zone 62.

Upon detection of an object (e.g., another vehicle) in the detection zone 24, the SOD radar 56 sends an alert signal indicating the presence of an object to either or both of the alert displays 82, 84 through the CAN bus 66. In response to receiving the alert signal, the displays 82, 84 provide an indicator (e.g., a visual, audio, or mechanical indicator), which indicates the presence of an object. Similarly, upon detection of an object in the detection zone 62, the SOD radar 58 sends an alert signal indicating the presence of another vehicle to one or both of alert displays 82, 86 through the CAN bus 66. However, in an alternate embodiment, the SOD radar 56 can communicate the alert signal to the alert display 82 through a human/machine interface (HMI) bus 68. Similarly, the SOD radar 58 can communicate an alert signal to the other alert display 86 through another human/machine interface (HMI) bus 70.

In some embodiments, the central processor 64 can combine or "fuse" data associated with each one of the SOD radars 56, 58, in order to provide fused detections of other automobiles present within the detections zones 60, 62, resulting is further display information in the alert displays 82, 86. Alternatively, the data from each SOD radar 56, 58 can be shared among all SOD radars 56, 58 and each SOD radar 56, 58 can combine (or fuse) all data provided thereto.

While two SOD radars 56, 58 are shown, the system 50 can include any number of SOD radars, including only one SOD radar. While the alert displays 82, 86 are shown to be associated with side view mirrors, the alert displays can be provided in a variety of ways. For example, in other embodiments, the alert displays can be associated with a central rear view mirror. In other embodiments, the alert displays are audible alert displays (e.g. speakers) disposed inside (or at least audible inside) the portion of the vehicle in which passengers sit.

While the CAN bus 66 is shown and described, it will be appreciated that the SOD radars 56, 58 can couple through any of a variety of other busses within the vehicle 52, including, but not limited to, an Ethernet bus, and a custom bus.

Figure 3:
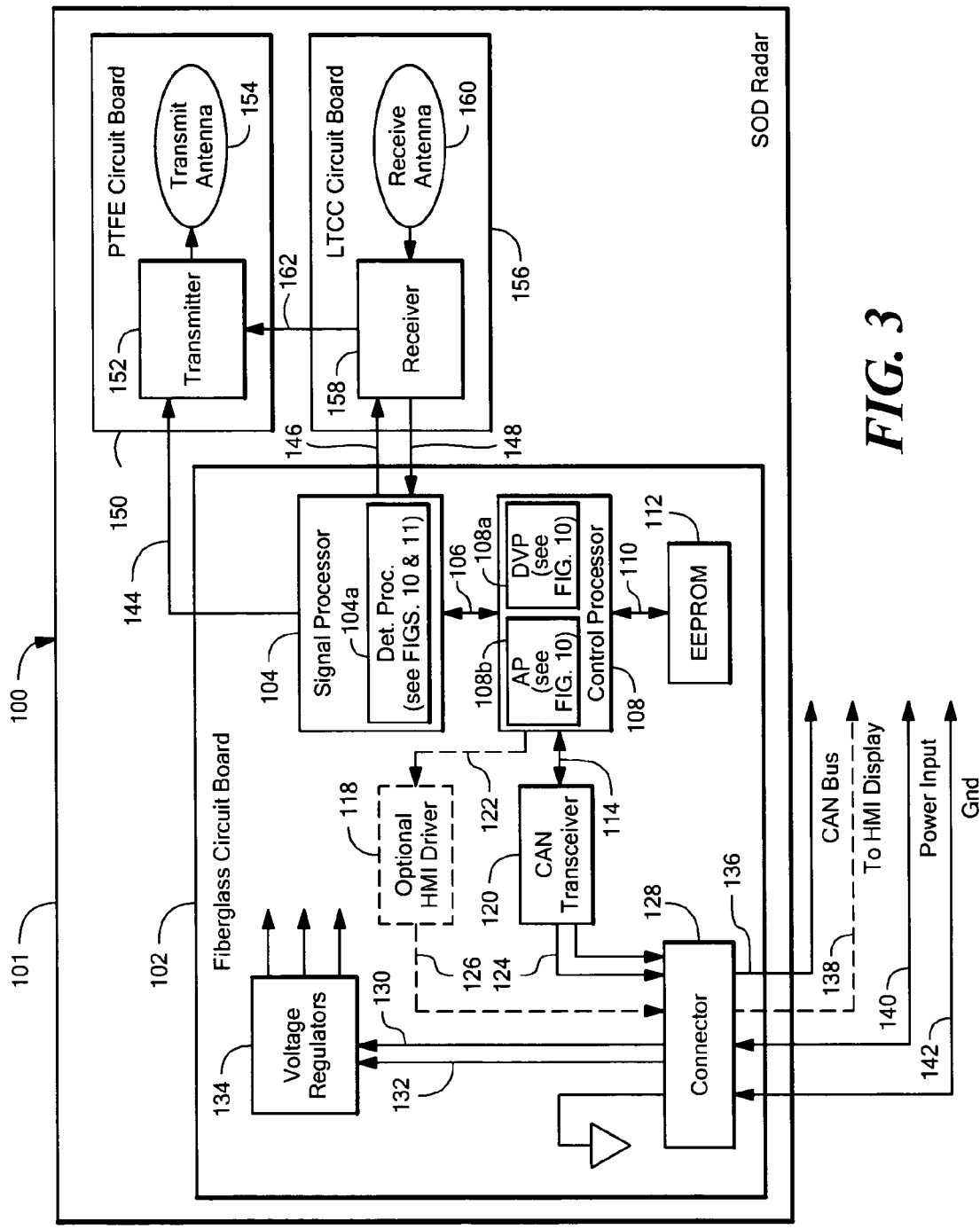
FIG. 3 is block diagram of a SOD radar.

Referring now to FIG. 3, a SOD radar 100 includes a housing 101, in which a fiberglass circuit board 102, a polytetrafluoroethylene (PTFE) circuit board 150, and a low temperature co-fired ceramic (LTCC) circuit board 156 reside. The SOD radar 100 can be the same as or similar to the SOD radars 56, 58 of FIG. 2.

The fiberglass circuit board 102 has disposed thereon a signal processor 104 coupled to a control processor 108. In general, the signal processor 104 is adapted to perform signal processing functions, for example, fast Fourier transforms. The signal processor can include a detection processor 104a adapted to detect targets in the detection zone (e.g., 24, FIG. 1) of the SOD radar 100.

The control processor 108 is adapted to perform other digital functions, for example, to identify conditions under which an operator of a vehicle on which the SOD radar 100 is mounted should be alerted to the presence of another object such as a vehicle in a blind spot. To this end, the control processor 108 includes a detection verification processor 108a and an alert processor 108b, each of which are descried more fully below.

While the detection processor 104a, the detection verification processor 108a, and the alert processor 108b are shown to be partitioned among the signal processor 104 and control processor 108 in a particular way, any partitioning of the functions is possible.

The control processor 108 is coupled to an electrically erasable read-only memory (EEPROM) 112 adapted to retain a variety of values, for example, threshold values described more fully below. Other read only memories associated with processor program memory are not shown for clarity.

The control processor 108 can also be coupled to a CAN transceiver 120, which is adapted to communicate, via a connector 128, on a CAN bus 136. The CAN bus 136 can be the same as or similar to the CAN bus 66 of FIG. 2.

The control processor 108 can also be coupled to an optional human/machine interface (HMI) driver 118, which can communicate via the connector 128 to an HMI bus 138. The HMI bus 138 can be the same as or similar to the HMI busses 68, 70 of FIG. 2. The HMI bus 138 can include any form of communication media and communication format, including, but not limited to, a fiber optic media with an Ethernet format, and a wire media with a two state format.

The fiberglass circuit board 102 can receive a power signal 140 and a signal 142. In a U.S. automobile, the power signal 140 would typically be provided as a 12 Volt DC signal (relative to the ground signal 142). Via the connector 128, the power and ground signals 140, 142, respectively, can be coupled to one or more voltage regulators 134 (only voltage regulator one being shown in FIG. 3 for clarity), which can provide one or more respective regulated voltages to the SOD radar 100.

The SOD radar 100 also includes the PTFE circuit board 150, on which is disposed radar transmitter 152 and a transmit antenna 154, which is coupled to the transmitter 154. The transmitter 152 is coupled to the signal processor 104 and the antenna 154 is coupled to the transmitter 152.

The SOD radar 100 also includes the LTCC circuit board 156 on which is disposed a radar receiver 158 and a receive antenna 160. The receiver 158 is coupled to the signal processor 104 and to the receive antenna 160. The receiver 158 can also be coupled to the transmitter 152, providing one or more RF signals 162 described below. The radar transmitter 152 and the radar receiver 158 receive regulated voltages from the voltage regulator 134.

In some embodiments, the transmit antenna 154 and the receive antenna 160 can be of a type described, for example, in U.S. Pat. No. 6,642,908, issued Nov. 4, 2003, U.S. Pat. No. 6,492,949, issued Dec. 10, 2002, U.S. patent application Ser. No. 10/293,880, filed Nov. 13, 2002, and U.S. patent application Ser. No. 10/619,020, filed Jul. 14, 2003. Each of these patents is incorporated herein by reference in its entirety.

In operation, the signal processor 104 generates one or more ramp signals 144, each having a respective start voltage and a respective end voltage. The ramp signals are fed to the transmitter 152. In response to the ramp signals 144, and in response to RF signals 162 provided by the receiver 158, the transmitter 152 generates RF chirp signals having waveform characteristics controlled by the ramp signals. The RF signals are provided from the transmitter to the transmit antenna 154, where the signal is emitted (or radiated) as RF chirp signals.

The transmit antenna 154 can transmit the RF chirp signals in one transmit beam or in more than one transmit beam. In either arrangement, the transmit antenna 154 transmits the RF chirp signal in an area generally encompassing the extent of a desired detection zone, for example, the detection zone 60 of FIG. 2.

The receive antenna 160 can form more than one receive beam, for example, seven receive beams 22a-22g as shown in FIG. 1. In other embodiments, 5, 6, 8, 9, 10 or 11 beams may be used. Regardless of the particular number of beams, each of the receive beams, or electronics associated therewith, receives composite signals, which include at least one of received RF signals and noise signals. Signals detected with the receive beams are directed to the radar receiver 158. The radar receiver 158 performs a variety of functions, including, but not limited to, amplification, mixing of composite signals with the chirp signal to provide a baseband signal, and analog to digital (A/D) conversion of the baseband signal, resulting in a converted signal 148.

It should be appreciated that, for the SOD FMCW chirp radar system 100, the converted signal 148 has a frequency content, wherein different frequencies of peaks therein correspond to detected objects at different ranges. The above-described amplification of the receiver 158 can be a time-varying amplification, controlled, for example, by a control signal 146 provided by the signal processor 104.

The signal processor 104 analyzes the converted signals 148 to identify an object in the above-described detection zone. To this end, in one particular embodiment, the signal processor 104 performs a frequency domain conversion of the converted signals 148. In one exemplary embodiment, this is accomplished by performing an FFT (fast Fourier transform) in conjunction with each one of the receive beams.

Some objects detected in the converted signal 148 by the signal processor 104 may correspond to objects for which an operator of a vehicle has little concern and need not be alerted. For example, an operator of a vehicle may not need to be alerted as the existence of a stationary guardrail along a roadside. Thus, further criteria can be used to identify when an alert signal should be generated and sent to the operator.

The control processor 108 receives detections 106 from the signal processor 104. The control processor 108 can use the further criteria to control generation of an alert signal 114. Upon determination by the control processor 108, the alert signal 114 can be generated, which is indicative not only of an object in the detection zone, but also is indicative of an object having predetermined characteristics being in the detection zone, for example, a moving object. Alternatively, the control processor 104 can use criteria to determine that an alert signal should not be generated.

The alert signal 114 can be communicated on the CAN bus 136 by the CAN transceiver 120. In other embodiments, an alert signal 122 can be communicated on the HMI bus 138 by the optional HMI driver 118.

The fiberglass circuit board 102, the PTFE circuit board 150, and the LTCC circuit board 156 are comprised of materials having known characteristics (including but not limited to insertion loss characteristics) for signals within particular frequency ranges. It is known, for example, that fiberglass circuit boards have acceptable signal carrying performance at signal frequencies up to a few hundred MHz. LTCC circuit boards and PTFE circuit boards are know to have acceptable signal carrying performance at much higher frequencies, however, the cost of LTCC and PTFE boards is higher than the cost of fiberglass circuit boards. Thus, the lower frequency functions of the SOD radar 100 are disposed on the fiberglass circuit board 102, while the functions having frequencies in the range of frequencies are disposed on the LTCC and on the PTFE circuit boards 150, 156, respectively.

While three circuit boards 102, 150, 156 are shown, the SOD radar 100 can be provided on more than three or fewer than three circuit boards. Also, the three circuit boards 102, 150, 156 can be comprised of materials other than those described herein.

Figure 4:
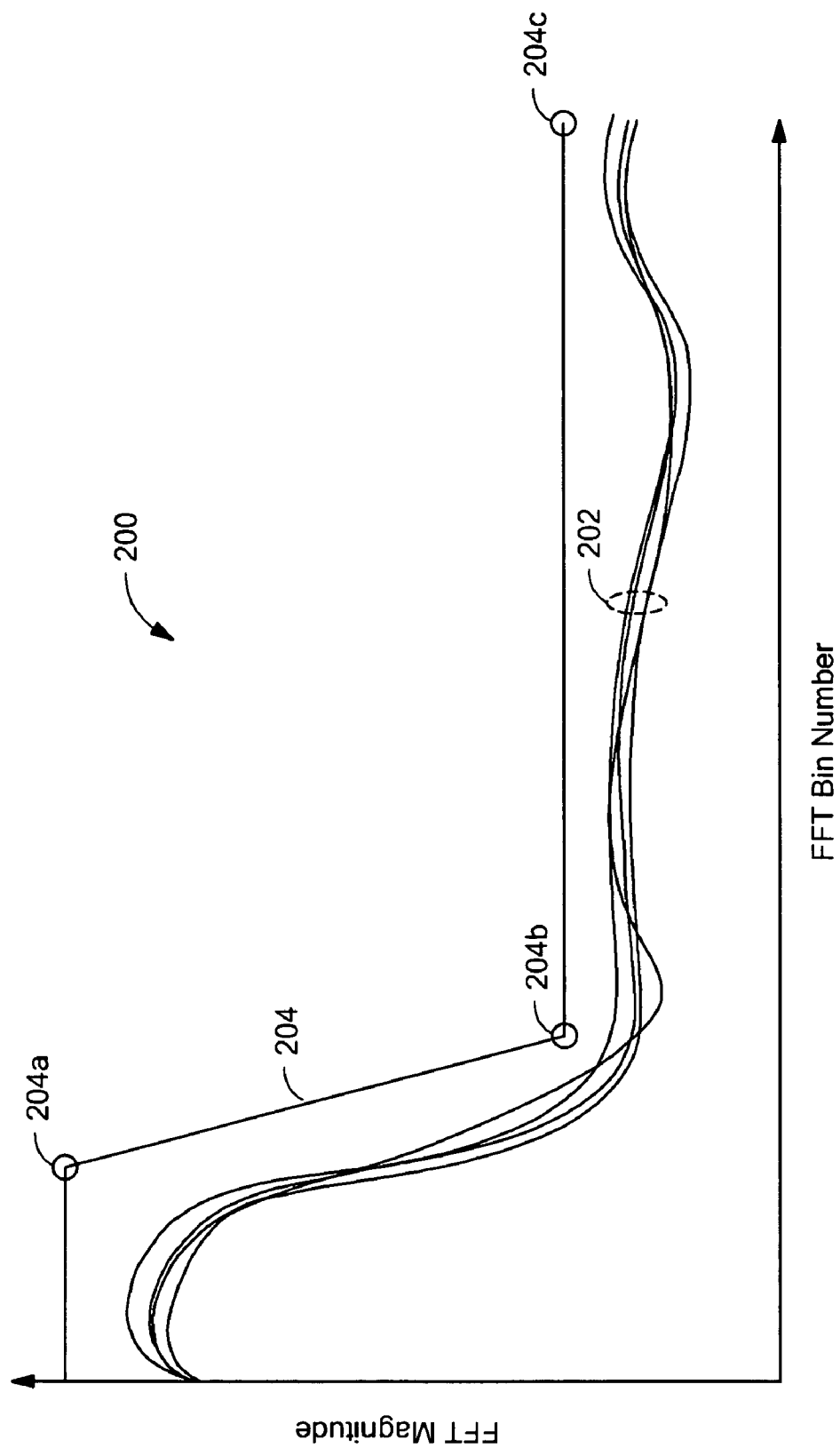
FIG. 4 a graph of fast Fourier transform (FFT) magnitude vs. FFT bin of a prior art radar detection threshold.

Referring now to FIG. 4, a curve 204 represents a detection threshold for a radar system (e.g. radar system 12, 14 of FIG. 1). Detection threshold curve 204 is plotted on a graph 200 having a horizontal scale representative of FFT bin numbers and a vertical scale in units of FFT magnitude. It should be understood that, by way of processing described above, the FFT bin numbers corresponds to ranges between the SOD radar 14 of FIG. 1 and a target (e.g. vehicle 18 may be identified as a target by the radar 14 disposed in vehicle 12).

If the value of FFT magnitude is above the detection threshold curve 204, then the radar system concludes that a target is present (i.e. FFT magnitudes values above the threshold curve 204 are indicative of a target), resulting in a detection. On the other hand, FFT magnitude values, which are below the threshold curve 204, are not of interest, and therefore, do no result in a detection.

Also plotted on graph 200 are a series of curves 202 representative of a plurality of outputs from the SOD radar receiver 158 (FIG. 3) associated with a single one of the receive beams (e.g., beam 22d, FIG. 1) after conversion to the frequency domain by the signal processor 104 (FIG. 3), when no target is present. Such curves can be generated, for example, during a special calibration process in a factory during manufacture of the SOD radar 14. In order to generate the FFT curves 202, the SOD radar 14 can be operated while stationary, and with no target present. Thus, the curves 202 are representative of background noises associated with the SOD radar 14.

The above-described background noises can include, but are not limited to, feed through from the transmit antenna 154 (FIG. 3) and from the transmitter 152 (FIG. 3) to the receive antenna 160 (FIG. 3) and to the receiver 158 (FIG. 3), thermal noise (also referred to a kT noise), quantization noise, circuit crosstalk within the SOD radar 100 (FIG. 3), and signal processing artifacts such as range sidelobes. Each one of the noises tends to limit the ability of the SOD radar 100 to detect a target.

The detection threshold curve 204 is selected by the below-described methods. As mentioned above, in operation, an FFT magnitude value falling above the threshold 204 may be indicative of a target. It should be understood that no such value is shown in FIG. 4, since no target is present during this calibration process.

The threshold 204 can be generated by selecting three points 204a, 204b, 204c and drawing lines therebetween. Each one of the points 204a, 204b, 204c can be selected based upon a criteria. For example, each one of the points 204a, 204b, 204c can be selected to be a predetermined distance above the highest of the FFT curves 202, at the frequency bin where the particular point resides.

It will be recognized that the generation of the threshold 202 is a manufacturing step, which results in higher cost of the SOD radar. It should also be recognized that the FFT curves 202, if generated by mounting the SOD radar in a calibration fixture, may not be fully representative of the SOD radar behavior when mounted to a vehicle. Thus, when selecting the threshold level 204 during manufacture it is necessary to select a threshold level, which is higher than what might otherwise be necessary. This results in the radar system not being able to detect targets that could otherwise be detected if an unnecessarily high threshold were not used. Thus, the radar operates with poorer detection performance than could otherwise be obtained.

Figure 5:
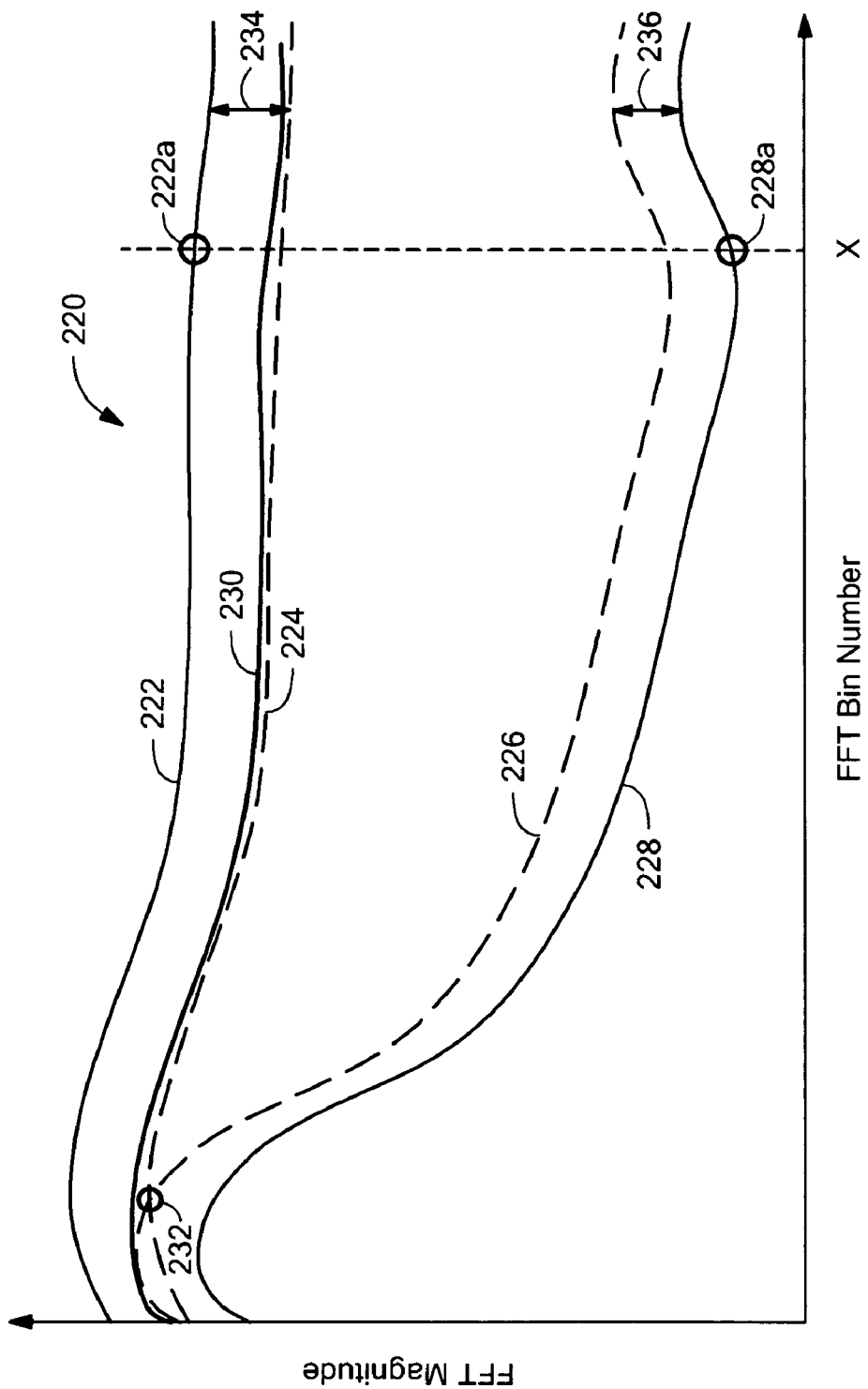
FIG. 5 a graph of radar detection threshold plotted as FFT magnitude vs. FFT bin generated in accordance with the present invention.

Referring now to FIG. 5, a graph 220 includes a horizontal scale representative of FFT bin number, also referred to herein as frequency bins and a vertical scale in units of FFT magnitude, also referred to herein as frequency domain values.

A curve 222 is representative of an upper percentile of a plurality of FFT curves (not shown for clarity). An exemplary upper percentile equal to a ninetieth percentile will be used herein for clarity. Therefore, in other words, at each FFT bin, for example the FFT bin X, the value of the curve 222, for example the value 222a, is such that ninety percent of the values of the plurality of FFT curves are less than the value 222a at frequency bin X.

A curve 228 is representative of a lower percentile of the plurality of FFT curves (not shown for clarity). An exemplary lower percentile equal to a tenth percentile will be used herein for clarity. Therefore, in other words, at each FFT bin, for example the FFT bin X, the value of the curve 228, for example the value 228a, is such that ten percent of the values of the plurality of FFT curves are less than the value 228a at frequency bin X.

The plurality of FFT curves (not shown), and the corresponding ninetieth percentile curve 222 and tenth percentile curve 228 are preferably generated when the SOD radar 14 (FIG. 1) is moving about, i.e. driven about in normal operation, in the presence of a variety of targets. When the SOD radar 14 is in the presence of large targets, the SOD radar tends to generate FFT curves with higher values than when the SOD radar is in the presence of no target or small targets.

Therefore, the curve 222 is generally representative of peaks of a plurality of FFT curves generated in the presence of targets during normal operation, while the curve 228 is generally representative of FFT curves generated in the presence of no target during normal operation. However, it should be understood that the curves 222, 228 are not necessarily representative of values from individual ones of the plurality of FFT curves, but, as described above, are representative of ninetieth percentile and tenth percentile boundaries, respectively, of the plurality of FFT curves generated when the SOD radar is moving about in normal operation.

A curve 224 is generated by subtracting an offset value 234 from the curve 222. A curve 226 is generated by adding an offset value 236 to the curve 226. The curve 224 can cross the curve 226 at a point 232. However, the curves 224, 226 need not intersect.

The offsets 234, 236 can be equal, or they can be different. In some embodiments, one or both of the offsets 234, 236 can be zero, in which case, either the curve 224 becomes the curve 222, or the curve 226 becomes the curve 228, or both. Offsets 234, 236 and associated thresholds described below are selected to reduce false detections to an acceptable level, while still allowing detection of small targets of interest, for example, motorcycles, with a high probability of detection.

A curve 230 corresponds to a detection threshold. The curve 230 is generated by selecting the largest of the curves 224, 226 across the FFT bins. Therefore, in the arrangement shown, the curve 230 follows the curve 226 for FFT bins below the FFT bin at which the point 232 occurs. The curve 230 follows the curve 224 for FFT bins above the FFT bin at which the point 232 occurs. In operation, an FFT curve having an FFT magnitude value falling above the threshold 230 may be indicative of a target.

While the curves 224, 226 are shown and described to be combined to generate the detection threshold 230, in other embodiments, only one of the percentile curves 222 or 228 is generated and only one offset value 234 or 236 is used to generate only one of the curves 224, 226. Therefore, in these embodiments, a detection threshold equals the curve 224 or 226. Also, in some embodiments, the offset value is zero, in which case, a detection threshold equals the curve 222 or 228.

Since the detection threshold 230 is generated in the presence of targets and using FFT values generated from target return signals, the detection threshold 230 can be generated while the SOD radar 14 (FIG. 1) is being moved about in normal operation by the vehicle 12 (FIG. 1) to which it is mounted. With this arrangement, a manufacturing step is avoided, which would otherwise be necessary to generate the detection threshold (e.g., detection threshold 204, FIG. 4).

It should be appreciated that this is in contrast to prior art techniques (e.g. the technique described above in conjunction with FIG. 4) in which the detection threshold is generated by during manufacture and not in normal operation.

It should also be appreciated that by enabling the detection threshold to be generated in the presence of targets and while the radar system is in operation and mounted to a vehicle, it is possible to dynamically reset the detection threshold. For example, it may be desirable to have one detection threshold computed in and for operation in a high-density object environment (e.g. city traffic or rush hour traffic) and have a second different detection threshold for a low-density object environment (e.g. travel on a roadway having relatively few other vehicles on the same roadway). Thus, the SOD radar may have a dynamically adjustable detection threshold value. Alternatively still, the system may be adapted to continually update the detection threshold, for example, once every two minutes.

It should be also appreciated that although reference is made herein to selection of certain percentiles (e.g. tenth and ninetieth percentiles) other percentiles may also be used in selection of a detection threshold.

Figure 6:
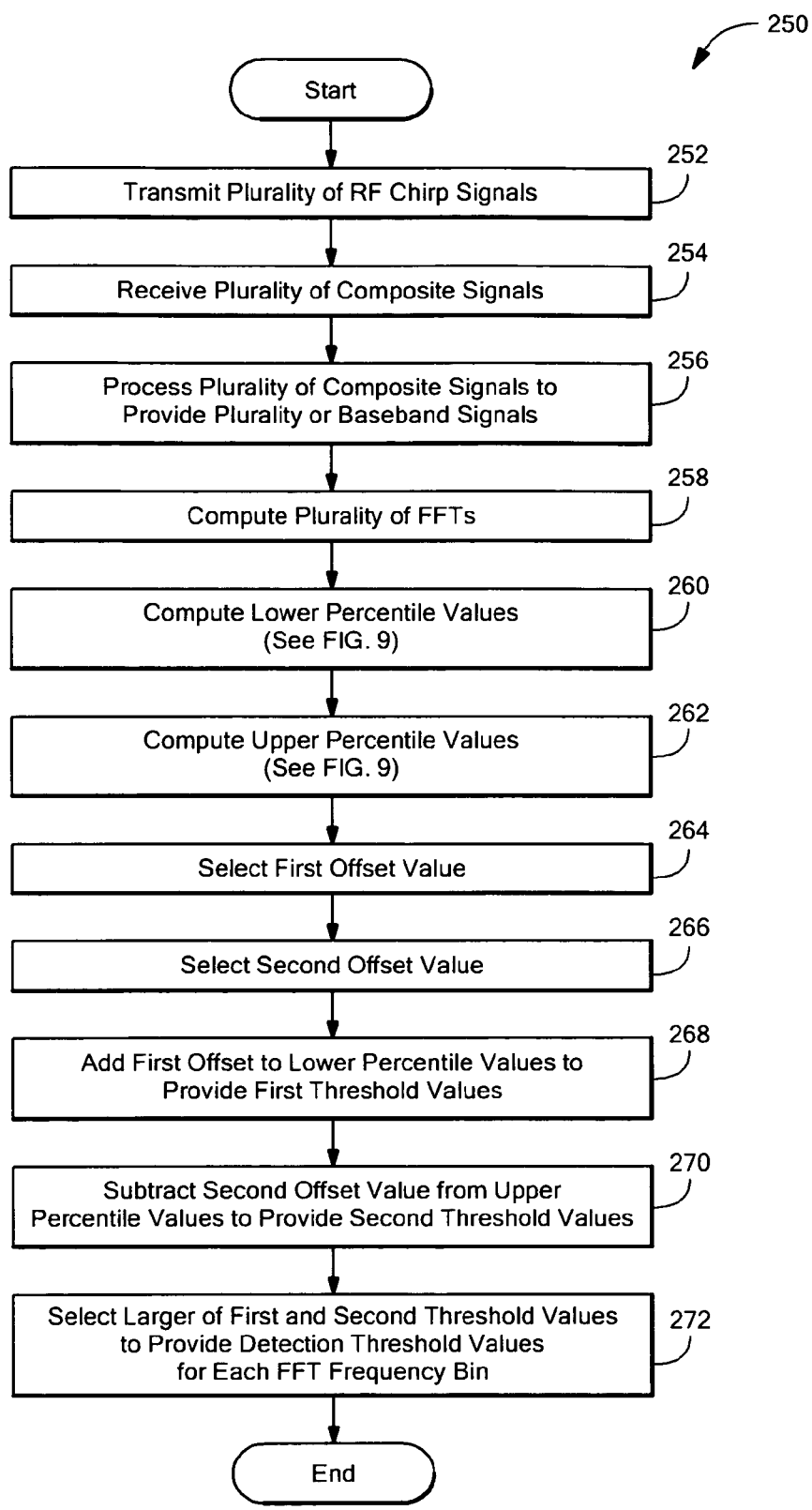
FIG. 6 is a flow chart of a process to generate a detection threshold.
Figure 8:
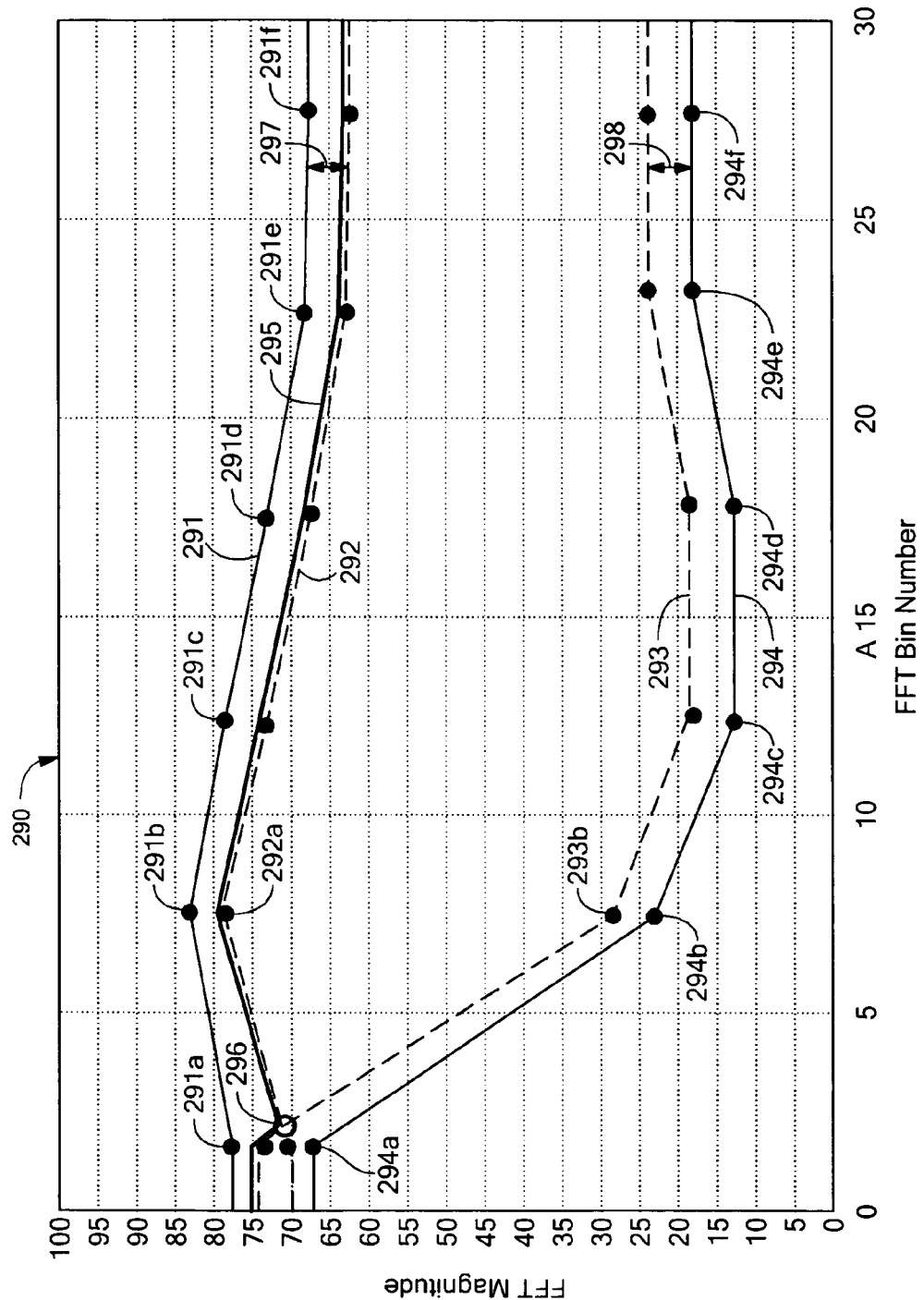
FIG. 8 is a graph plotted as a fraction of FFT magnitude vs. FFT bin, which was generated using values of shown in FIG. 7.

It should be appreciated that FIGS. 6 and 8 show flowcharts corresponding to the below contemplated technique, which would be implemented in the SOD radar 100 (FIG. 3). Rectangular elements (typified by element 252 in FIG. 6), herein denoted "processing blocks," represent computer software instructions or groups of instructions. Diamond shaped elements, herein denoted "decision blocks," represent computer software instructions, or groups of instructions, which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the invention. Thus, unless otherwise stated the blocks described below are unordered meaning that, when possible, the steps can be performed in any convenient or desirable order.

Referring now to FIG. 6, a process 250 begins at step 252, where a plurality of radar chirp signals are generated by the SOD radar 100 of FIG. 3. It should be appreciated that the process 250 can be repeated for each one of the pluralities of composite signals associated with each one of a plurality of receive beams (e.g., 22a-22g, FIG. 1), resulting in a respective detection threshold associated with each one of the receive beams 22a-22g.

Taking the receive beam 22a to be representative of other ones of the receive beams 22b-22g, at block 254, a plurality of composite signals are received by the beam 22a of the SOD radar 100 (FIG. 3). It will be understood that a portion of the composite signals can be received as received RF signals by a receive antenna (e.g., 160, FIG. 3), while other portions of the composite signal can be received as noise signals within the SOD radar 100 (FIG. 3). The SOD radar 14 can receive a plurality of composite signals associated with the receive beam 22a, and other pluralities of composite signals associated with the receive beam 22b, and so forth.

Again, taking the receive beam 22a to be representative of other ones of the receive beams 22b-22g, some of the plurality of composite signals associated with the receive beam 22a may include respective echoes associated with associated transmitted RF signals. It will be appreciated that an echo is indicative of a target (i.e., a peak in the frequency domain). Some other ones of the composite signals associated with the receive beam 22a may not include an echo, i.e., may not be indicative of a target. However, as described above, both composite signals that include an echo and composite signals that do not include an echo can include a variety of noise signals.

It should be appreciated that a composite signal that does not include an echo may still be associated with a transmitted RF signal, even if only associated by proximity in time. The composite signal may also include various feed through contributions associated with the transmitted RF signal, resulting in a further association of the composite signal with the transmitted RF signal.

At block 256, the SOD radar 100 (FIG. 3) processes the plurality of composite signals associated with the receive beam 22a to provide a respective plurality of baseband signals.

At block 258, a plurality of FFTs are computed, one for each one of the plurality of baseband signals associated with the receive beam 22a. Each FFT has a plurality of frequency bins and a plurality of frequency domain values.

At block 260, lower percentile values (e.g. tenth percentile values) are computed from among the plurality of FFTs. The tenth percentile values can correspond, for example, to the curve 228 of FIG. 5. Tenth percentile values can be computed at each frequency bin, or alternatively, by a process described in conjunction with FIGS. 7 and 8.

At block 262, upper percentile values (e.g. ninetieth percentile values) are computed from among the plurality of FFTs. The ninetieth percentile values can correspond, for example, to the curve 222 of FIG. 5. Ninetieth percentile values can be computed at each frequency bin, or alternatively, by a process described in conjunction with FIGS. 7 and 8.

At blocks 264 and 266, first and second offset values are selected, respectively. The first offset value can correspond to the offset value 236 of FIG. 5 and the second offset value can correspond to the offset value 234 of FIG. 5. As described above, offset values and associated thresholds described below are selected to reduce false detections to an acceptable level, while still allowing detection of small targets of interest, for example, motorcycles, with a high probability of detection.

At block 266, the first offset value is added to the each one of the tenth percentile values to provide first threshold values. The first threshold values can correspond, for example, to the curve 226 of FIG. 5.

At block 270, the second offset value is subtracted from each one of the ninetieth percentile values to provide second threshold values. The second threshold values can correspond, for example, to the curve 224 of FIG. 5.

At block 272, a detection threshold is generated by selecting from among the first and second threshold values, for example, by selecting the larger of the first and second threshold values at each one of the frequency bins. The detection threshold can correspond, for example, to the curve 230 of FIG. 5.

As described above, the process 250 can be repeated for each one of the receive beams 22a-22g (FIG. 1), resulting in a respective detection threshold that can be applied to a respective frequency domain signal (FFT) associated with each one of the beams 22a-22g.

In accordance with other embodiments described above in conjunction with FIG. 5, while two pluralities of percentile values are shown and described to be combined at block 272 to generate the detection threshold values, in other embodiments, only one of the pluralities of percentile values of blocks 260 or 262 is generated and only one of the offset values of blocks 264 or 266 is used to generate only one of the first or second threshold values of blocks 268 of 270. Therefore, in these embodiments, the detection threshold equals the first or second threshold values of blocks 268 or 270. Also, in some embodiments, the offset value is zero, in which case, the detection threshold values equals the percentile values of block 260 or 262.

Figure 7:
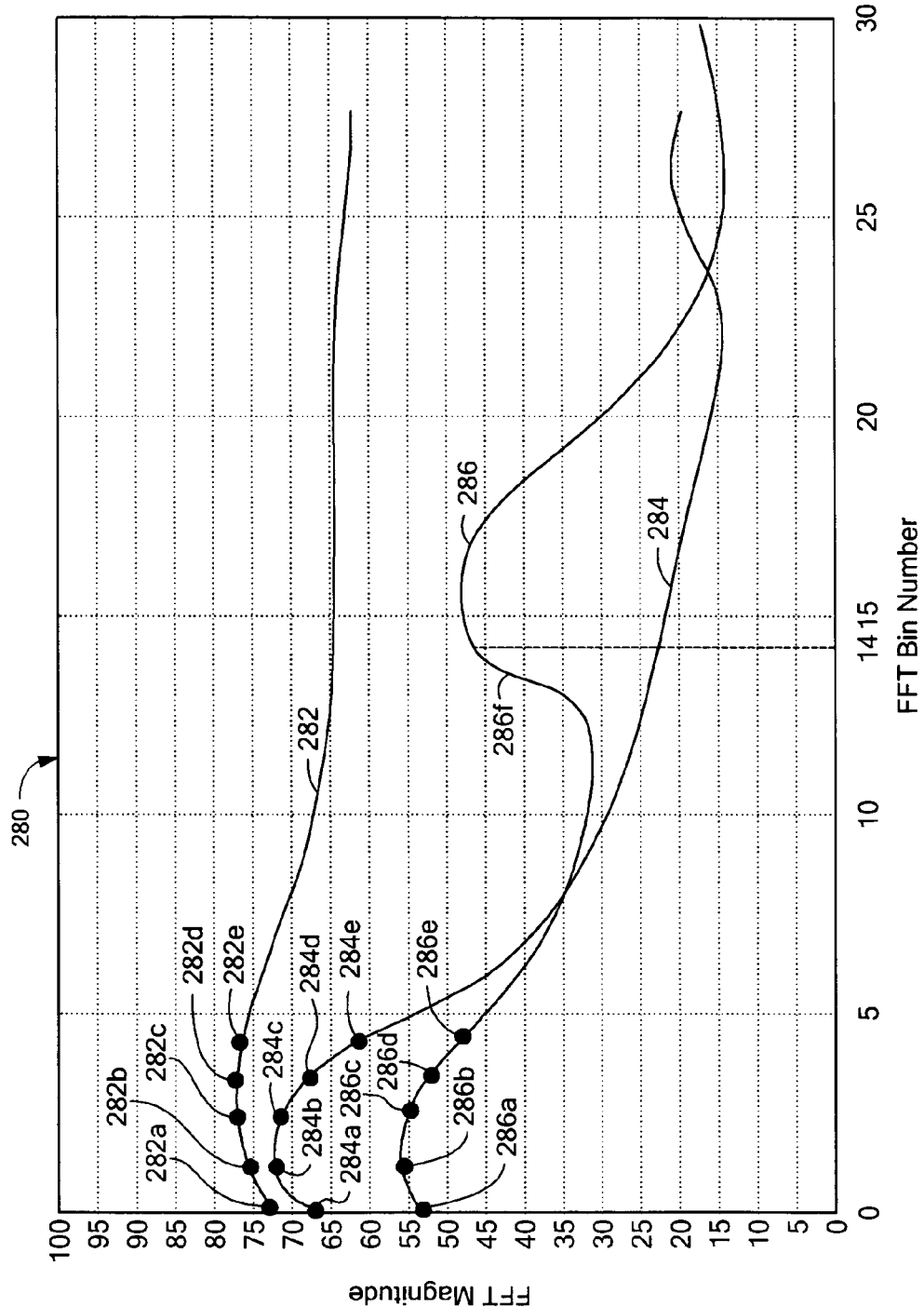
FIG. 7 is a graph showing FFT frequency bin ranges and FFT magnitude ranges.

Referring now to FIG. 7, a graph 280 includes a horizontal scale representative of FFT bin number, also referred to herein as frequency bins. The graph 280 also includes a vertical scale in units of FFT magnitude, also referred to herein as frequency domain values. The frequency bins are grouped into six ranges, 0-4, 5-9, 10-14, 15-19, 20-24, 25-29, each having five frequency bins. The frequency domain values are grouped into twenty ranges, 0-4 through 95-99. It should be understood that more or fewer than six frequency bin ranges may be used. It should also be understood that fewer or more than five bins may be used in each range. One of ordinary skill in the art will appreciate how to select a particular number of frequency bin ranges and the number of bins to include in each range for any given application Curves 282, 284, 286, each correspond to one of a plurality of FFT curves generated from a respective composite signal associated with one receive beam, for example, the receive beam 22*a* of FIG. 1. For clarity, only some of the associated frequency domain values are shown on the graph 280.

The curve 282 includes points 282*a*-282*e*, each associated with a respective frequency bin 0-4. The curve 284 includes points 284*a*-284*e*, each associated with the respective frequency bin 0-4. The curve 286 includes points 286*a*-286*e*, each associated with a respective frequency bin 0-4. The curve 286 also includes a peak 286*f* indicative of a target at a range corresponding to frequency bin 14 As described above in conjunction with FIG. 5, the plurality of FFT curves used to generate the ninetieth percentile curve 222 (FIG. 5) and the tenth percentile curve 228 (FIG. 5) are generated when the SRS radar 14 (FIG. 1) is moving in the presence of targets and in the presence of no targets.

The peak 286*f* is relatively broad in frequency bin (range) extent. Processing details described, for example in U.S. Pat. No. 6,577,269, issued Jun. 10, 2003, can be used to identify a particular range (e.g., bin 14) to the target, with a higher resolution than would be represented by the relatively wide peak 286*f*. This patent is incorporated herein in its entirety.

In the frequency bin range 0-4, one point 286*e* falls into the frequency domain value range of 45-49, three points 286*a*, 286*c*, 286*d* fall into 50-54, one point 286*b* falls into 55-59, one point 284*e* falls into 60-64, two points 284*a*, 284*d* fall into 65-69, four points 284*b*, 284*c*, 282*a*, 282*b* fall into 70-74, and three points 282*c*, 282*d*, 282*e* fall into 75-79. Thus, from the points, one tenth percentile value and one ninetieth percentile value can be generated for the frequency bin range of 0-4. Similarly one tenth percentile value and one ninetieth percentile value can be generated for the frequency bin range of 5-9, and so on.

Referring now to FIG. 8, a graph 290 includes a horizontal scale representative of FFT bin number (also referred to herein as frequency bins or FFT bins) and a vertical scale in units of FFT magnitude (also referred to herein as frequency domain values). The FFT bins are grouped into six ranges, 0-4, 5-9, 10-14, 15-19, 20-24, 25-29, each having five frequency bins. The frequency domain values are grouped into twenty ranges, 0-4 through 95-99.

The graph 290 includes an upper (e.g., ninetieth) percentile curve 291, which is generated by connecting ninetieth percentile values 291*a*-291*f* with straight lines. A ninetieth percentile value 291*b* is but one example of other ninetieth percentile values, each shown as dots labeled 291*a*-291*f*, wherein one ninetieth percentile value is associated with each one of the frequency bin ranges 0-4 . . . 25-29. The ninetieth percentile curve 291 is comparable to the ninetieth percentile curve 222 of FIG. 5, but has a piece-wise linear form.

The graph 290 also includes a lower (e.g., tenth) percentile curve 294, which is generated by connecting tenth percentile values with straight lines. A tenth percentile value 294*b* is but one example of other tenth percentile values, each shown as dots 294*a*-294*f*, wherein one tenth percentile value is associated with each one of the frequency bin ranges 0-4 . . . 25-29. The tenth percentile curve 294 is comparable to the tenth percentile curve 228 of FIG. 5, but has a piece-wise linear form.

It should be apparent from the discussion in conjunction with FIG. 5, that a curve 292 can be generated by subtracting an offset value 297 from the ninetieth percentile curve 291. Also, a curve 293 can be generated by adding an offset value 298 to the tenth percentile curve 294. Curves 292, 293 cross at a point 296. A detection threshold 295 can be generated as a maximum of the curves 291, 292 in each frequency bin. The detection threshold 295 is comparable to the detection threshold 230 of FIG. 5, but has a piece-wise linear form.

While the tenth percentile values and the ninetieth percentile values are shown to be connected with straight lines, forming piece-wise linear curves, in other embodiments, the percentile values can be connected with horizontal and vertical lines, forming step linear curves. In still other embodiments, the percentile values are connected with non-linear curves, for example, with quadratic curves, resulting in piece-wise non-linear curves.

Regardless of the form of the tenth percentile curve 294 and ninetieth percentile curve 291 used, and the resulting form of the detection threshold 295, it will be appreciated that the resulting detection threshold can be stored as a number of detection threshold values equal to the number of frequency bin ranges. Here, six frequency bin ranges are shown, thus, six detection threshold values result, which are associated with the beam 22*a* of FIG. 1. The detection threshold value 292*a* is but one example of the six detection threshold values. Another six detection threshold values can be generated for each one of the other beams 22*b*-22*g* of FIG. 1, resulting in a total of forty-two detection threshold values.

The above-described arrangement provides a reduction in required memory space required to store the resulting detection thresholds. For example, the above-described forty-two detection threshold values represent a small number of values that can be stored in a memory within the SOD radar 100 of FIG. 3.

While a particular number of frequency bins, particular frequency bin ranges, and particular frequency domain value ranges are described in conjunction with FIGS. 7 and 8, it will be understood that the above-described techniques can be used for any number of frequency bins, for frequency bin ranges having any number of frequency bins, and for frequency domain value ranges having any number of frequency domain values.

Similar to some embodiments described above in conjunction with FIG. 5, while the curves 292, 293 are shown and described to be combined to generate the detection threshold 295, in other embodiments, only one of the percentile curves 291 or 294 is generated and only one offset value 297 or 298 is used to generate only one of the curves 292, 293. Therefore, in these embodiments, the detection threshold equals the curve 292 or 293. Also, in some embodiments, the offset value is zero, in which case, the detection threshold equals the curve 291 or 294.

Figure 9:
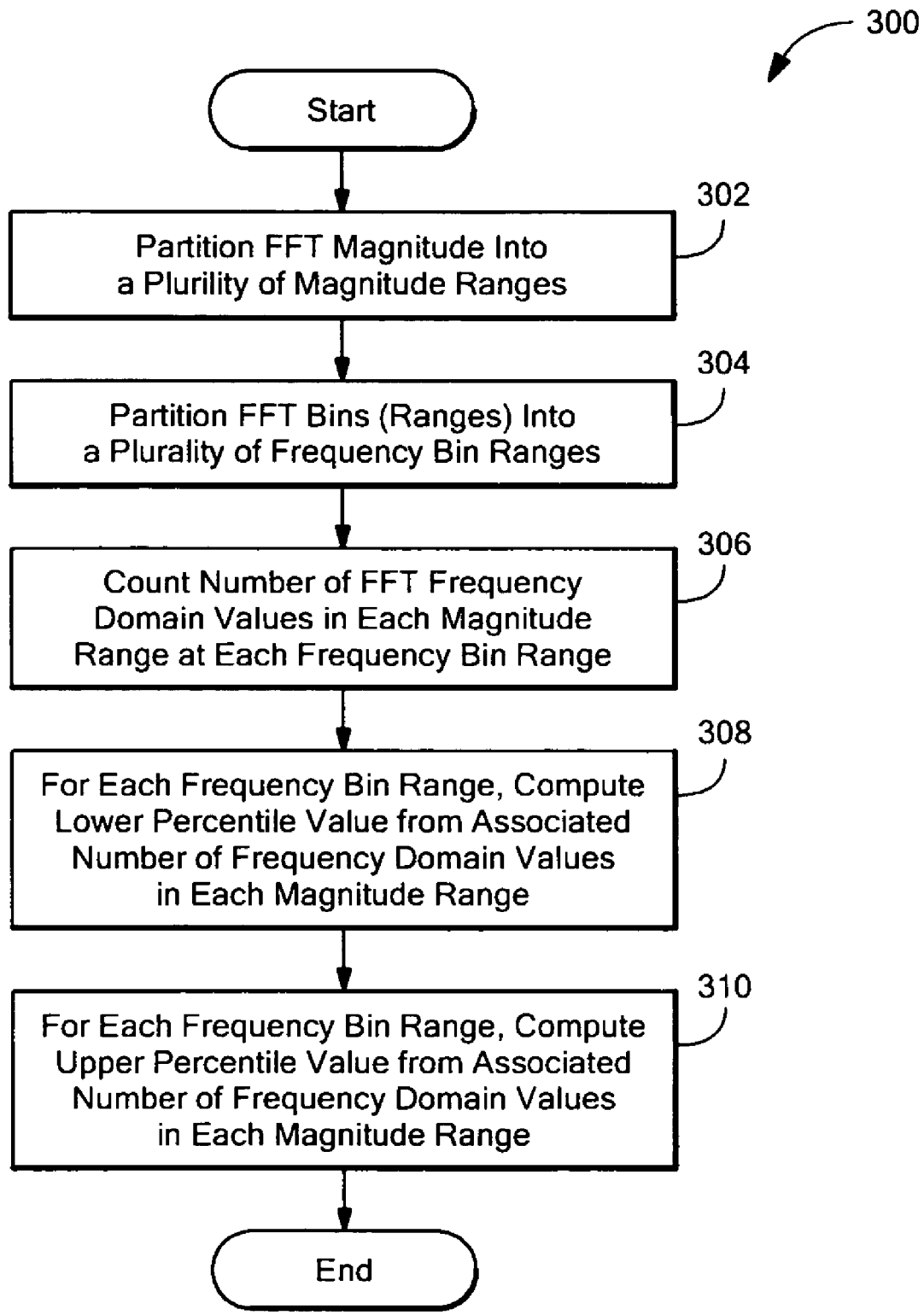
FIG. 9 is a flow chart showing an exemplary storage data reduction process, which can be used in the process of FIG. 6.

Referring now to FIG. 9, a process 300 begins at block 302, where FFT magnitudes, or frequency domain values, are partitioned into a plurality of frequency value ranges. The frequency domain value ranges can be the same as or similar to the ranges 0-4 . . . 95-99, etc. shown in FIGS. 7 and 8. Similarly, at block 304, FFT bins, or frequency bins, are partitioned into a plurality frequency bin ranges. The frequency bin ranges can be the same as or similar to the ranges 0-4 . . . 25-29, etc. shown in FIG. 7. The number of frequency value ranges and the number of frequency bin ranges are selected in accordance with a desired memory size necessary to store resulting threshold values described below.

At block 306, numbers of frequency domain values are counted in each frequency domain value range for each frequency bin range.

At block 308, for each frequency bin range, a predetermined lower percentile value (e.g. tenth percentile value) is computed from an associated number of frequency domain values in each frequency domain value range at the frequency bin range.

At block 310, for each frequency bin range, a predetermined upper percentile value (e.g. ninetieth percentile value) is computed from an associated number of frequency domain values in each frequency domain value range at the frequency bin range.

The process 300 can be used to provide the percentile values (e.g. tenth and ninetieth percentile values) associated with blocks 260, 262 of FIG. 6.

Figure 10:
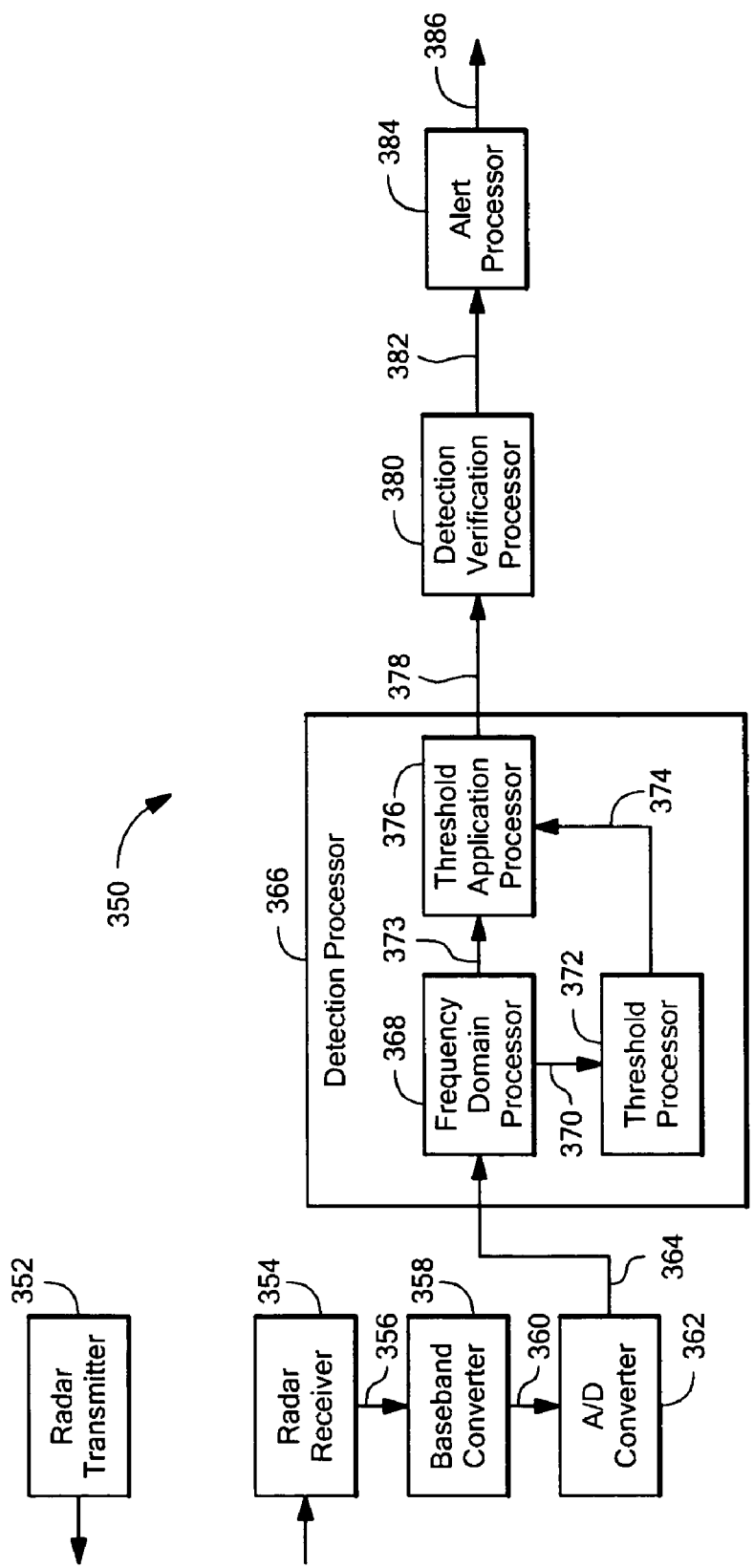
FIG. 10 is a block diagram of a SOD radar having a detection processor.

Referring now to FIG. 10, an SOD radar 350 which may be the same as or similar to the SOD radar 100 of FIG. 3, includes a radar transmitter 352. The radar transmitter 352 can be the same as or similar to the transmitter 152 and transmit antenna 154 of FIG. 3. The SOD radar 350 also includes a radar receiver 354.

The radar receiver 304 can provide radio frequency (RF) signals 356 to a baseband converter 358. The baseband converter 358 is adapted to convert the RF signals 356 to baseband signals 360, which are provided to an A/D converter 362. The baseband signals 360 are generated by converting the RF signals 356 to a lower frequency. The radar receiver 354 in combination with the baseband converter 358 and the A/D converter 362 can be the same as or similar to the receiver 158 and receive antenna 160 of FIG. 3.

The A/D converter 362 provides digital signals 364 to a detection processor 366. The detection processor 366 includes those elements, which can perform functions that can be performed by the signal processor 104 and/or the control processor 108 of FIG. 3. The detection processor 366 can be the same as or similar to the detection processor 104a of FIG. 3.

The detection processor 366 includes a frequency domain processor 368 adapted to receive the digital signals 364 and to convert the digital signals 364 to frequency domain signals 373, 370. The frequency domain signals 370 are received by a threshold processor 372, which generates a detection threshold 374. The frequency domain signals 373 and the detection threshold 374 are received by a threshold application processor 376. The threshold application processor 376 is adapted to compare the frequency domain signals 373 with the detection threshold 374 and to provide a detection signal 378 indicative of the presence or absence of an object in a detection zone (e.g. 24, FIG. 1), also referred to herein as a field of view (FOV), of the SOD radar 350.

A detection verification processor 380 is adapted to receive the detection signal 378 and to further process the detection signal 378 in order to apply further criteria to validate or to invalidate a detection of an object. The detection verification processor 380 can generate a verified detection signal 332 accordingly. The detection verification processor 380 can be the same as or similar to the detection verification processor 108a described above in conjunction with FIG. 3.

An alert processor 384 is adapted to receive the verified detection signal 382 and to generate an alert 386. The alert signal 386 can be in a variety of forms, including, but not limited to, a visual alert signal and an audible alert signal to an operator of a vehicle. The alert signal 386 makes an operator of a vehicle, for example, the vehicle 12 of FIG. 1, upon which the SOD radar 350 is mounted, aware of another vehicle (e.g. vehicle 18 in FIG. 1) to the side of the vehicle 12. The alert processor 384 can be the same as or similar to the alert processor 108b of FIG. 3.

Functions of the detection processor 366, the detection verification processor 380, and the alert processor 384 can be performed by the signal processor 104 and/or the control processor 108 of FIG. 3, with any partitioning among the signal processor 104 and control processor 108.

In some embodiments, the detection verification processor 380 is omitted, and the alert processor 384 receives the detection signals 378, without verification.

Figure 11:
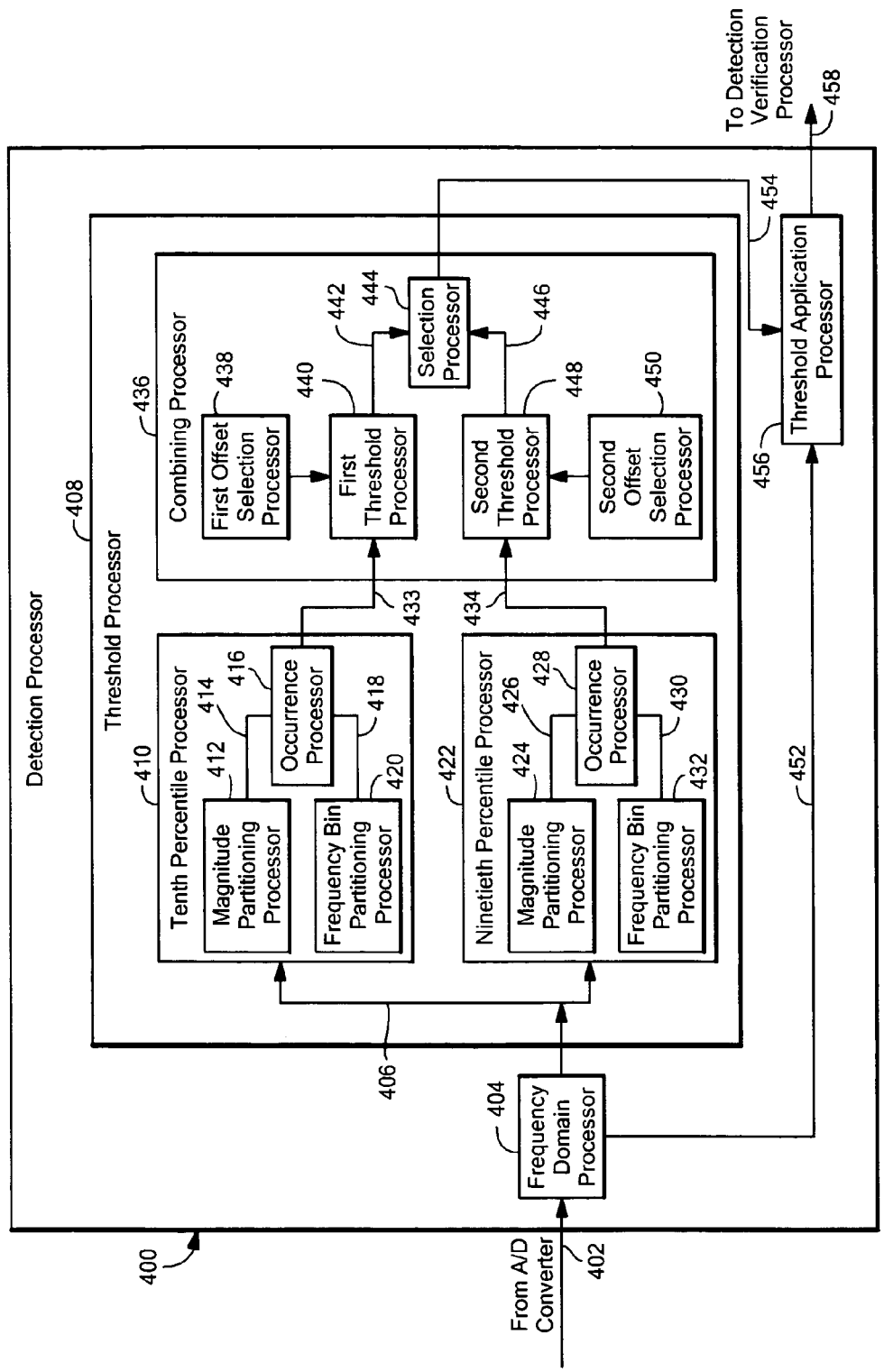
FIG. 11 is a block diagram of the detection processor of FIG. 10.

Referring now to FIG. 11, a detection processor 400 includes a frequency domain processor 404 adapted to receive digital signals 402 and to convert the digital signals 402 to frequency domain signals 406,452. In one particular embodiment, the frequency domain processor 408 performs fast Fourier transforms, wherein each one of the frequency domain signals 406, 452 has corresponding frequency bins and associated frequency domain values.

The detection processor 400 also includes a threshold processor 408 comprising an upper (e.g. tenth) percentile processor 410 adapted to receive the frequency domain signals 406 from the frequency domain processor 404.

It should be appreciated that the detection processor 400, the frequency domain processor 404, and threshold processor 408 may be the same as or similar to respective ones of detection processor 366 (FIG. 10), frequency domain processor 368 (FIG. 10) and threshold processor 372 (FIG. 10).

The tenth percentile processor 410 includes a magnitude partitioning processor 412, a frequency bin partitioning processor 420 and an occurrence processor 416, each adapted to receive the frequency domain signals 406 from the frequency domain processor 404.

The magnitude partitioning processor 412 is adapted to partition magnitudes of the frequency domain values in the frequency domain signals 406 into a plurality of magnitude ranges 414 and to provide the magnitude ranges 414 to the occurrence processor 416. The frequency bin partitioning processor 420 is adapted to partition the frequency bins in the frequency domain signals 406 into a plurality of frequency bin ranges 418 and to provide the frequency bin ranges 418 to the occurrence processor 416. The magnitude ranges 414 can be the same as or similar to the magnitude ranges 0-4 . . . 95-99 of FIGS. 7 and 8, and the frequency bin ranges 416 can be the same as or similar to the frequency bin ranges 0-4 . . . 25-29 of FIGS. 7 and 8.

The occurrence processor 416 is adapted to count numbers of frequency domain values that fall within each of the magnitude ranges 414 at each of the frequency bin ranges 416. The occurrence processor 416 is also adapted to compute tenth percentile values 433, wherein the tenth percentile values 433 are indicative of ten percent of the frequency domain values in a frequency bin range being at or below the tenth percentile values.

The threshold processor 408 also includes an upper (e.g., ninetieth) percentile processor 422, which is adapted to receive the frequency domain signals 406 from the frequency domain processor 404. The ninetieth percentile processor 422 includes a magnitude partitioning processor 424, a frequency bin partitioning processor 432 and an occurrence processor 428, each adapted to receive the frequency domain signals 406 from the frequency domain processor 404.

The magnitude partitioning processor 424 is adapted to partition magnitudes of the frequency domain values in the frequency domain signals 406 into a plurality of magnitude ranges 426 and to provide the magnitude ranges 426 to the occurrence processor 428. The frequency bin partitioning processor 432 is adapted to partition the frequency bins in the frequency domain signals 406 into a plurality of frequency bin ranges 430 and to provide the frequency bin ranges 430 to the occurrence processor 428. The magnitude ranges 426 can be the same as or similar to the magnitude ranges 0-4 . . . 95-99 of FIGS. 7 and 8, and the frequency bin ranges 430 can be the same as or similar to the frequency bin ranges 0-4 . . . 25-29 of FIGS. 7 and 8.

The occurrence processor 428 is adapted to count numbers of frequency domain values that fall within each of the magnitude ranges 426 at each of the frequency bin ranges 430. The occurrence processor 428 is also adapted to compute ninetieth percentile values 434, wherein the ninetieth percentile values 434 are indicative of ninety percent of the frequency domain values in a frequency bin range being at or below the ninetieth percentile values 434.

The tenth percentile values 433 and the ninetieth percentile values 434 are received by a combining processor 436. The combining processor 436 includes first and second offset selection processors 438, 450, respectively, which are adapted to select first and second offset values, respectively. The first and second offset values can be the same as or similar to the offset values 286, 284, respectively of FIG. 8. A first threshold processor 440 is adapted to combine the tenth percentile values 433 with the first offset value from the first offset selection processor 438 to generate first threshold values 442. A second threshold processor 448 is adapted to combine the ninetieth percentile values 434 with the second offset value from the second offset selection processor 450 to generate second threshold values 446.

A selection processor 444 is adapted to select from among the first threshold values 442 and the second threshold values 446 to provide detection threshold values and corresponding detection threshold 454. In one particular embodiment, the selection processor selects a largest one of a first threshold value 442 and a second threshold value at each frequency bin.

The detection processor 400 also includes a threshold application processor 456, which compares the frequency domain signals 452 with the detection threshold 454 provide a detection signal 458. The detection signal 458 can be the same as or similar to the detection signal 378 of FIG. 10.

It should be understood that, in some embodiments, the two magnitude partitioning processors 412, 424 can perform the same function. Therefore, in some embodiments, the two magnitude partitioning processors 412, 424 can be replaced by one magnitude partitioning processor. Also, in some embodiments, the two frequency bin partitioning processors 420, 432 can perform the same function. Therefore, in some embodiments, the two frequency bin partitioning processors 420, 432 can be replaced by one frequency bin partitioning processor.

While tenth and ninetieth percentiles and associated percentile values are described in embodiments above, it should be understood that, in other embodiments, any two percentiles and associated percentile values can be used. Furthermore, it should be understood that the two percentile values used can be the same percentile value, in which case, one of the percentile values is redundant and not used.

Also, while two percentile processors 410, 422, in other embodiments, the detection processor 400 has only one of the percentile processors 410, 422, and only one of the offset selection processors 438, 450 and one of the threshold processors 440, 446 accordingly.

All references cited herein are hereby incorporated herein by reference in their entirety.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. A method of generating a radar threshold associated with a radar, comprising:
   transmitting a plurality of radio frequency (RF) signals;
   receiving a plurality of composite signals, each composite signal including at least one of a received RF signal and a noise signal;
   converting the plurality of composite signals to provide a plurality of baseband signals;
   transforming the plurality of baseband signals to the frequency domain to provide a respective plurality of frequency domain signals, each one of the plurality of frequency domain signals having a corresponding plurality of frequency domain values and a respective plurality of frequency bins;
   computing a first plurality of percentile values from the plurality of frequency domain values associated with at least two of the plurality of frequency domain signals; and
   generating a detection threshold associated with the first plurality of percentile values.

2. The method of claim 1, wherein each one of the plurality of composite signals is associated with a same single receive beam.

3. The method of claim 1, wherein the transmitted RF signals comprise RF chirp signals.

4. The method of claim 1, wherein the generating comprises:
   selecting a first offset value; and
   combining the first offset value with the first plurality of percentile values.

5. The method of claim 1, wherein the generating comprises:
   selecting the detection threshold values to be equal to the first plurality of percentile values.

6. The method of claim 1, wherein the computing the first plurality of percentile values comprises:
   partitioning magnitudes of the plurality of frequency domain values into a plurality of magnitude ranges;
   partitioning the plurality of frequency bins into a plurality of frequency bin ranges;
   counting numbers of frequency domain values, from among the plurality of frequency domain values, that fall within the plurality of magnitude ranges at each of the frequency bin ranges; and
   computing the first plurality of percentile values from the numbers of frequency domain values that fall within the plurality of magnitude ranges at each of the frequency bin ranges.

7. The method of claim 1, further comprising:
  computing a second plurality of percentile values from the plurality of frequency domain values associated with the at least two of the plurality of frequency domain signals; and
  combining the first plurality of percentile values and the second plurality of percentile values to provide one or more detection threshold values.

8. The method of claim 7, wherein the combining comprises selecting from among the first plurality of percentile values and the second plurality of percentile values to provide the one or more detection threshold values.

9. The method of claim 7, wherein the combining comprises selecting largest values from among the first plurality of percentile values and the second plurality of percentile values to provide the one or more detection threshold values.

10. The method of claim 7, wherein the combining comprises:
  selecting a first offset value;
  selecting a second offset value;
  adding the first offset value to each one of the first plurality of percentile values to provide first threshold values;
  subtracting the second offset value from the second plurality of percentile values to provide second threshold values; and
  selecting one or more values from among the first threshold values and second threshold values to provide the one or more detection threshold values.

11. The method of claim 10, wherein at least one of the first offset value and the second offset value is equal to zero.

12. The method of claim 10, wherein the selecting one or more values from among the first threshold values and the second threshold values comprises selecting largest values from among the first threshold values and the second threshold values to provide the one or more detection threshold values.

13. The method of claim 7, wherein the computing the first plurality of percentile values comprises:
  partitioning magnitudes of the plurality of frequency domain values into a plurality of magnitude ranges;
  partitioning the plurality of frequency bins into a plurality of frequency bin ranges;
  counting numbers of frequency domain values, from among the plurality of frequency domain values, that fall within the plurality of magnitude ranges at each of the frequency bin ranges; and
  computing the first plurality of percentile values from the numbers of frequency domain values that fall within the plurality of magnitude ranges at each of the frequency bin ranges, and wherein the computing the second plurality of percentile values comprises:
  partitioning magnitudes of the plurality of frequency domain values into a plurality of magnitude ranges;
  partitioning the plurality of frequency bins into a plurality of frequency bin ranges;
  counting numbers of frequency domain values, from among the plurality of frequency domain values, that fall within the plurality of magnitude ranges at each of the frequency bin ranges; and
  computing the second plurality of percentile values from the numbers of frequency domain values that fall within the plurality of magnitude ranges at each of the frequency bin ranges.

14. The method of claim 7, wherein the radar has a field of view, the method further including moving the radar so that a variety of objects pass through the field of view.

15. The method of claim 1, wherein the radar has a field of view, the method further including moving the radar so that a variety of objects pass through the field of view.

16. Apparatus for generating a radar threshold, comprising:
  a radar transmitter adapted to transmit a plurality of RF signals;
  a radar receiver adapted to receive a plurality of composite signals, each composite signal including at least one of a received RF signal and a noise signal;
  a baseband converter adapted to convert the plurality of composite signals to provide an associated plurality of baseband signals;
  a frequency domain processor adapted to transform the plurality of baseband signals to the frequency domain to provide a respective plurality of frequency domain signals, each one of the plurality of frequency domain signals having a corresponding plurality of frequency domain values and a respective plurality of frequency bins;
  a first percentile processor adapted to compute a first plurality of percentile values from the plurality of frequency domain values associated with at least two of the plurality of frequency domain signals; and
  a threshold processor adapted to generate a detection threshold associated with the first plurality of percentile values.

17. The apparatus of claim 16, wherein each one of the plurality of composite signals is associated with a same single receive beam.

18. The apparatus of claim 16, wherein the transmitted RF signals comprise RF chirp signals.

19. The apparatus of claim 16, wherein the threshold processor includes:
  a first threshold processor adapted to combine a first offset value to the first plurality of percentile values.

20. The apparatus of claim 16, wherein the threshold processor includes:
  a selection processor adapted to select the detection threshold values to be equal to the first plurality of percentile values.

21. The apparatus of claim 16, wherein the first percentile processor comprises:
  a magnitude partitioning processor adapted to partition magnitudes of the plurality of frequency domain values into a plurality of magnitude ranges;
  a frequency bin partitioning processor adapted to partition the plurality of frequency bins into a plurality of frequency bin ranges; and
  an occurrence processor adapted to count numbers of frequency domain values, from among the plurality of frequency domain values, that fall within the plurality of magnitude ranges at each of the frequency bin ranges, and further adapted to compute the first plurality of percentile values from the numbers of frequency domain values that fall within the plurality of magnitude ranges at each of the frequency bin ranges.

22. The apparatus of claim 16, further comprising:
  a second percentile processor adapted to compute a second plurality of percentile values from the plurality of frequency domain values associated with the at least two of the plurality of frequency domain signals; and
  a combining processor adapted to combine the first plurality of percentile values and the second plurality of percentile values to provide one or more detection threshold values.

23. The apparatus of claim 22, wherein the combining processor is further adapted to select one or more values from among the first plurality of percentile values and second plurality of percentile values to provide the one or more detection threshold values.

24. The apparatus of claim 22, wherein the combining processor is further adapted to select one or more values largest values from among the first plurality of percentile values and the second plurality of percentile values to provide the one or more detection threshold values.

25. The apparatus of claim 22, wherein the combining processor comprises:
- a first threshold processor adapted to add a first offset value to the first plurality of percentile values to provide first threshold values;
- a second threshold processor adapted to subtract a second offset value from the second plurality of percentile values to provide second threshold values; and
- a selection processor adapted to select from one or more values among the first threshold values and second threshold values to provide the one or more detection threshold values.

26. The apparatus of claim 25, wherein at least one of the first offset value and the second offset value is equal to zero.

27. The apparatus of claim 25, wherein the selection processor is adapted to select one or more values largest values from among the first threshold values and the second threshold values to provide the one or more detection threshold values.

28. The apparatus of claim 22, wherein the first percentile processor comprises:
- a magnitude partitioning processor adapted to partition magnitudes of the plurality of frequency domain values into a plurality of magnitude ranges;
- a frequency bin partitioning processor adapted to partition the plurality of frequency bins into a plurality of frequency bin ranges; and
- an occurrence processor adapted to count numbers of frequency domain values, from among the plurality of frequency domain values, that fall within the plurality of magnitude ranges at each of the frequency bin ranges, and further adapted to compute the first plurality of percentile values from the numbers of frequency domain values that fall within the plurality of magnitude ranges at each of the frequency bin ranges, and wherein the second percentile processor comprises:
- a magnitude partitioning processor adapted to partition magnitudes of the plurality of frequency domain values into a plurality of magnitude ranges;
- a frequency bin partitioning processor adapted to partition the plurality of frequency bins into a plurality of frequency bin ranges; and
- an occurrence processor adapted to count numbers of frequency domain values, from among the plurality of frequency domain values, that fall within the plurality of magnitude ranges at each of the frequency bin ranges, and further adapted to compute the second plurality of percentile values from the numbers of frequency domain values that fall within the plurality of magnitude ranges at each of the frequency bin ranges.

* * * * *

UNITED STATES PATENT AND TRADEMARK OFFICE
CERTIFICATE OF CORRECTION

| | |
|---|---|
| PATENT NO. | : 7,336,219 B1 |
| APPLICATION NO. | : 11/322684 |
| DATED | : February 26, 2008 |
| INVENTOR(S) | : Lohmeier et al. |

It is certified that error appears in the above-identified patent and that said Letters Patent is hereby corrected as shown below:

Column 2, line 5 delete "object" and replace with --objects--.

Column 2, line 48 delete "FIG. 4 a" and replace with --FIG. 4 is a--.

Column 2, line 50 delete "FIG. 5 a" and replace with --FIG. 5 is a--.

Column 2, line 58 delete "using values of shown" and replace with --using values shown--.

Column 4, lines 65-66 delete "Detection," and replace with --Detection,"--.

Column 5, line 25 delete "The 50" and replace with --The system 50--.

Column 5, line 53 delete "is" and replace with --in--.

Column 7, line 61 delete "as the" and replace with --as to the--.

Column 8, line 19 delete "know" and replace with --known--.

Column 8, line 34 delete "system" and replace with --systems--.

Column 8, line 39 delete "corresponds" and replace with --correspond--.

Column 8, line 45 delete "magnitudes" and replace with --magnitude--.

Column 8, line 66 delete "a" and replace with --as--.

UNITED STATES PATENT AND TRADEMARK OFFICE
CERTIFICATE OF CORRECTION

PATENT NO.         : 7,336,219 B1
APPLICATION NO.    : 11/322684
DATED              : February 26, 2008
INVENTOR(S)        : Lohmeier et al.

It is certified that error appears in the above-identified patent and that said Letters Patent is hereby corrected as shown below:

Column 10, lines 47-48 delete "generated by during" and replace with --generated during--.

Signed and Sealed this

Twenty-third Day of September, 2008

JON W. DUDAS
*Director of the United States Patent and Trademark Office*